US012529244B2

(12) United States Patent
Spence et al.

(10) Patent No.: US 12,529,244 B2
(45) Date of Patent: Jan. 20, 2026

(54) ELECTRIFIED LATCH

(71) Applicant: Hanchett Entry Systems, Inc., Phoenix, AZ (US)

(72) Inventors: Baruch Spence, Phoenix, AZ (US); Ryan M. Sims, Mesa, AZ (US); Ben Williams, Queen Creek, AZ (US); James Griffin, Chandler, AZ (US)

(73) Assignee: Hanchett Entry Systems, Inc., Phoenix, AZ (US)

( * ) Notice: Subject to any disclaimer, the term of this patent is extended or adjusted under 35 U.S.C. 154(b) by 377 days.

(21) Appl. No.: 17/705,829

(22) Filed: Mar. 28, 2022

(65) Prior Publication Data

US 2022/0220775 A1 Jul. 14, 2022

Related U.S. Application Data

(63) Continuation-in-part of application No. 16/804,720, filed on Feb. 28, 2020, now Pat. No. 12,196,001.
(Continued)

(51) Int. Cl.
*E05B 47/00* (2006.01)
*E05B 63/00* (2006.01)
(Continued)

(52) U.S. Cl.
CPC ........ *E05B 47/0012* (2013.01); *E05B 65/006* (2013.01); *G01K 3/005* (2013.01);
(Continued)

(58) Field of Classification Search
CPC ............... E05B 65/0082; E05B 65/104; E05B 2063/0091; E05B 39/00; E05B 2047/0023;
(Continued)

(56) References Cited

U.S. PATENT DOCUMENTS 1,473,985 A 11/1923 Boyer et al.
1,833,572 A 11/1931 Hardesty
(Continued)

FOREIGN PATENT DOCUMENTS

CN 107724813 2/2018
EP 0712982 5/1996
(Continued)

*Primary Examiner* — Christine M Mills
*Assistant Examiner* — Peter H Watson
(74) *Attorney, Agent, or Firm* — Woods Oviatt Gilman LLP; Dennis B. Danella, Esq.

(57) ABSTRACT

An electromechanical component for a locking mechanism is provided. The locking mechanism includes a latching component having a latch member reciprocally movable between a locked orientation and an unlocked orientation. The electromechanical component comprises a drive member configured to be coupled to the latch member, an actuator operably coupled to the drive member, a temperature sensor for sensing an ambient temperature associated with the locking mechanism; and a printed circuit board (PCB) in communication with the temperature sensor and the actuator. When the PCB receives a control signal to move the latch member between the locked orientation and the unlocked orientation, and the temperature sensor senses that the ambient temperature is below a predetermined threshold temperature, the PCB is configured to direct a pulsed current signal to the actuator to move the latch member between the locked orientation and the unlocked orientation.

22 Claims, 19 Drawing Sheets

Related U.S. Application Data

(60) Provisional application No. 62/831,923, filed on Apr. 10, 2019, provisional application No. 62/812,647, filed on Mar. 1, 2019.

(51) Int. Cl.
*E05B 65/00* (2006.01)
*G01K 3/00* (2006.01)

(52) U.S. Cl.
CPC ................. *E05B 2047/0017* (2013.01); *E05B 2047/0069* (2013.01); *E05B 2047/0074* (2013.01); *E05B 2063/0091* (2013.01)

(58) Field of Classification Search
CPC ..... E05B 2047/0069; E05B 2047/0035; E05B 2047/0037; E05B 17/20; E05B 17/2007; E05B 17/2038; E05B 59/00; E05B 65/0075; E05B 47/06; E05B 47/0603; E05B 47/0665; E05B 47/0673; E05B 47/026; E05B 47/02; E05B 47/0002; E05B 47/0005; E05B 47/0012; E05B 65/0089; E05B 65/02; E05B 65/025; E05B 2047/0091; E05B 2047/0017; E05B 2047/0074; G01K 3/005
See application file for complete search history.

(56) References Cited

U.S. PATENT DOCUMENTS

| | | | | |
|---|---|---|---|---|
| 2,842,631 | A | 7/1958 | Martens | |
| 4,800,741 | A | 1/1989 | Kerschenbaum | |
| 5,816,083 | A | 10/1998 | Bianco | |
| 5,979,199 | A | 11/1999 | Elpern | |
| 6,400,278 | B1 | 6/2002 | Weyerstall et al. | |
| 6,496,101 | B1 | 12/2002 | Stillwagon | |
| 6,900,720 | B2 | 5/2005 | Denison | |
| 8,633,800 | B2 | 1/2014 | Bates | |
| 8,633,829 | B2 | 1/2014 | Cavanaugh | |
| 9,735,646 | B2 | 8/2017 | Johnson | |
| 10,121,026 | B1 | 11/2018 | Ryland | |
| 10,537,038 | B2 | 1/2020 | Reese | |
| 2010/0045053 | A1 | 2/2010 | Dye | |
| 2011/0047874 | A1 | 3/2011 | Lowder et al. | |
| 2014/0182489 | A1 | 7/2014 | Suggs | |
| 2015/0184426 | A1 | 7/2015 | Arlinghaus | |
| 2016/0145904 | A1 * | 5/2016 | Lowder | E05B 47/0001 292/145 |
| 2016/0255421 | A1 | 9/2016 | Farrar | |
| 2016/0319571 | A1 | 11/2016 | Johnson | |
| 2017/0141549 | A1 | 5/2017 | Hare et al. | |
| 2017/0292294 | A1 * | 10/2017 | Brennan | E05B 65/108 |
| 2018/0066453 | A1 | 3/2018 | Dobbins | |
| 2018/0248704 | A1 | 8/2018 | Coode | |
| 2019/0085596 | A1 * | 3/2019 | Walsh | E05B 47/026 |
| 2019/0383061 | A1 | 12/2019 | Shen et al. | |

FOREIGN PATENT DOCUMENTS

| | | |
|---|---|---|
| ES | 2733743 | 11/2019 |
| FR | 2634508 | 1/1990 |
| KR | 101376279 | 3/2014 |
| WO | 9921200 | 4/1999 |

* cited by examiner

ELECTRIFIED LATCH

RELATIONSHIP TO OTHER APPLICATIONS AND PATENTS

The present application is a continuation-in-part of U.S. patent application Ser. No. 16/804,720, filed Feb. 28, 2020, which claims the benefit of U.S. Provisional Patent Application No. 62/812,647, filed Mar. 1, 2019 and U.S. Provisional Patent Application No. 62/831,923, filed Apr. 10, 2019, which are hereby incorporated by reference in their entirety.

TECHNICAL FIELD

The present invention relates to a cabinet lock for securing a door panel to a cabinet frame; and more particularly, to an electromechanical cabinet lock including an actuator; and still more particularly, to an electromechanical cabinet lock including a drive member such as a drive screw or a drive plate, wherein the actuator is a motor acting on the drive member, and wherein a position sensor is configured to trigger a signal when a latch member of the cabinet lock translates from a locked orientation to an unlocked orientation; and still more particularly, an electromechanical cabinet lock including a temperature sensor configured to trigger a signal for powering the actuator based on the detected temperature, such as sending a pulsed current signal, selecting from different motor drive profiles, and/or dynamically adjusting motor drive parameters of the actuator to advance movement of the latch member in cold weather conditions. The electromechanical component of the cabinet lock may be unitized so as to be adaptable to an existing mechanical latching component to electrify the cabinet lock.

BACKGROUND OF THE INVENTION

Cabinet locks, such as those used with traffic control signal boxes, typically include a mechanical key switch which is manually turned to withdraw a latch or deadbolt and thereby pivotally free the cabinet door from the cabinet frame and allow access to the interior of the cabinet. These traffic control signal boxes may include controllers and related circuitry to control and coordinate traffic lights and vehicular traffic through the associated intersection. However, the cabinet locks used on traffic control signal boxes are generally unmonitored, meaning any tampering or unauthorized access may go unnoticed for some period of time. With a focus on heightened homeland security, there is a need for improving the integrity and remote monitoring of traffic control signal boxes.

In addition, signal control boxes may be subject to extreme temperatures in certain areas of the country. For instance, in situations where a signal box is subject to extremely cold temperatures, the viscosity of the grease that is used to lubricate an actuator shaft of an actuator (e.g., stepper motor) can increase to the point where the movement of the actuator shaft operates in a sluggish manner or even sticks in some cases. This could result in the actuator failing to move the latch to an unlocked orientation. Thus, a remedy for sluggish or inoperative latch movement in cold weather is also needed. It is a principal object of the present invention to address these, as well as other, needs.

SUMMARY OF THE INVENTION

Briefly described, a cabinet lock for securing a door panel to a cabinet frame includes a latching component and an electromechanical component. The latching component has a latch housing and a latch member reciprocally translatable between a locked orientation whereby the latch member extends outwardly of the latch housing to secure the door panel to the cabinet frame and an unlocked orientation whereby the latch member retracts within the latch housing to free the door panel from the cabinet frame. The electromechanical component includes an actuator operably coupled to a drive member. A first end of the drive member engages the latch member whereby powering of the actuator in a first direction translates the latch member to the unlocked orientation. The latch member may be a latch or dead bolt.

The actuator may be a motor and the drive member may be a drive screw. The electromechanical component may further include a drive nut rotatably coupled to the actuator whereby powering of the actuator rotates the drive nut to translate the drive screw and latch member to the unlocked orientation. The latching component may further include a manual actuator coupled to the latch member. The manual actuator may include a cylinder having a cam located at a first end whereby manual actuation of the cylinder causes the cam to engage the latch member and drive the latch member to the unlocked orientation. The latching component may also further include a biasing member configured to bias the latch member to the locked orientation. Additionally or alternatively, powering of the actuator in a second direction may translate the latch member to the locked orientation.

In accordance with another aspect of the invention, the actuator may be a motor and the drive member may be a drive plate rotatable by the actuator. The electromechanical component may further include a latch pin coupled to the latch member whereby powering of the actuator rotates the drive plate. A guide channel formed in the drive plate receives the latch pin so that rotation of the drive plate translates the latch member to the unlocked orientation. The latching component may further include a manual actuator coupled to the latch member. The manual actuator may include a cylinder having a cam located at a first end whereby manual actuation of the cylinder causes the cam to engage the latch member and drive the latch member to the unlocked orientation. The latching component may also further include a biasing member configured to bias the latch member to the locked orientation. Additionally or alternatively, powering of the actuator in a second direction may translate the latch member to the locked orientation.

In accordance with another aspect of the invention, a traffic signal control box comprises a cabinet have a side wall framing an opening therein to permit access to an interior defined by the cabinet and a door panel is mounted to the side wall frame A cabinet lock includes a latching component and an electromechanical component. The latching component has a latch housing and a latch member reciprocally translatable between a locked orientation whereby the latch member extends outwardly of the latch housing to secure the door panel to the cabinet frame and an unlocked orientation whereby the latch member retracts within the latch housing to free the door panel from the cabinet frame. The electromechanical component includes an actuator operably coupled to a drive member. A first end of the drive member engages the latch member whereby powering of the actuator in a first direction translates the latch member to the unlocked orientation.

In accordance with a further aspect of the present invention, the electromechanical component may further include a drive member position sensor configured to emit a signal when the drive member translates the latch member from the locked orientation to the unlocked orientation. The drive member position sensor may comprise an optical infrared emitter and detector pair. In a further aspect, the position sensor may include a beam interrupter fabricated from a material having a consistent translucency for allowing transmission of the optical beam or the material may define a plurality of stratified sub-regions having different degrees of translucency wherein the position sensor is capable of detecting serial movement of the drive member between a latch-locked orientation and a latch-unlocked orientation.

In yet another aspect of the invention, a separate electromechanical component may be retrofit-able to an existing latching component whereby a mechanical cabinet lock may be converted to a power operated cabinet lock.

In yet another aspect of the invention, a method is provided for retrofitting the electromechanical component to an existing cabinet lock having only a latching component, the method including the steps of:

1. providing a cabinet lock having a latching component wherein the latching component includes a latch member;
2. providing an electromechanical component including an actuator connectable to a power source; wherein the electromechanical component further includes a drive member;
3. providing a connector feature; and
4. connecting the drive member to the latch member via the connector feature.

The electromechanical component may further include a position sensor for sensing the position of the latch member wherein the method further includes triggering of a signal by the position sensor that the latch member is being translated from a locked orientation to an unlocked orientation.

In a further aspect, a cabinet lock for securing a door panel to a cabinet housing is provided. The cabinet lock comprises a latching component, a temperature sensor, and an electromechanical component. The latching component includes a latch housing and a latch member reciprocally translatable between a locked orientation to secure the door panel to the cabinet housing and an unlocked orientation to free the door panel from the cabinet housing. The temperature sensor is configured for sensing an ambient temperature associated with the cabinet lock. The electromechanical component includes a printed circuit board (PCB) and an actuator (e.g., stepper motor). The actuator is operably coupled to a drive member, and the drive member is coupled to the latch member. The PCB is in communication with the temperature sensor and the actuator. When the PCB receives a control signal to move the latch member between the locked orientation and the unlocked orientation, and the temperature sensor senses that the ambient temperature is below a predetermined threshold temperature, the PCB is configured to direct a pulsed current signal to the actuator to move the latch member between the locked orientation and said unlocked orientation. It should be understood that the present invention may also be directed to the electromechanical component described above, as well as the cabinet lock described above used in association with a traffic signal control box including a cabinet and an associated door panel.

The pulsed current signal referred to above may be associated with a first motor drive profile to move the latch member between the locked orientation and said unlocked orientation when the PCB receives a control signal to move the latch member between the locked and unlocked orientations, and the temperature sensor senses that the ambient temperature is below a predetermined threshold temperature. Further, the PCB may be configured to direct the pulsed current signal to the actuator to move the latch member between the locked and unlocked orientations according to a second motor drive profile when the sensed ambient temperature is at or above said predetermined threshold value, and wherein said first motor drive profile is different than said second motor drive profile.

Further, the first motor drive profile may be one of a plurality of motor drive profiles, wherein the PCB is configured for selecting the first motor drive profile from the plurality of motor drive profiles based on the sensed ambient temperature. Also, each of the plurality of motor drive profiles may comprise a plurality of motor drive parameters including acceleration rate, deceleration rate, maximum speed, minimum speed, acceleration motor torque current, deceleration motor torque current, run speed motor torque current, motor holding torque current, and stepping modes. The PCB may be further configured to adjust any of the motor drive parameters when the pulse current signal is provided to the actuator to optimize retraction of the latch member.

The cabinet lock may further comprise a position sensor, wherein the PCB is further configured to detect whether the latch member has reached the unlocked orientation utilizing the position sensor. When the position sensor detects that the latch member is not in the unlocked orientation, the PCB is configured to either select another one of the plurality of motor drive profiles or adjust one or more of the motor drive parameters of the first motor drive profile to move the latch member to the unlocked orientation. Also, the first motor drive profile may include a speed profile, wherein the PCB is further configured to vary at least one of a period, a duration, a shape, and/or a sequence of the speed profile when the actuator is moving the latch member between the locked and unlocked orientations.

In yet another aspect, a method of actuating a latch member between a locked orientation to secure a door panel to a cabinet housing and an unlocked orientation to free the door panel from the cabinet housing is provided. An electromechanical component includes a printed circuit board (PCB) and an actuator, wherein the actuator is operably coupled to a drive member, and the drive member is coupled to the latch member. The method comprises the steps of: receiving a control signal to move the latch member between the locked orientation and the unlocked orientation; sensing an ambient temperature associated with the latch member; determining if the sensed ambient temperature is below a predetermined threshold temperature; and if it is determined that the sensed ambient temperature is below the predetermined threshold temperature, directing a pulsed current signal to the actuator to move the latch member between the locked orientation and the unlocked orientation.

Numerous applications, some of which are exemplarily described below, may be implemented using the present invention.

BRIEF DESCRIPTION OF THE DRAWINGS

The present invention will now be described, by way of example, with reference to the accompanying drawings, in which.

Figure 1:
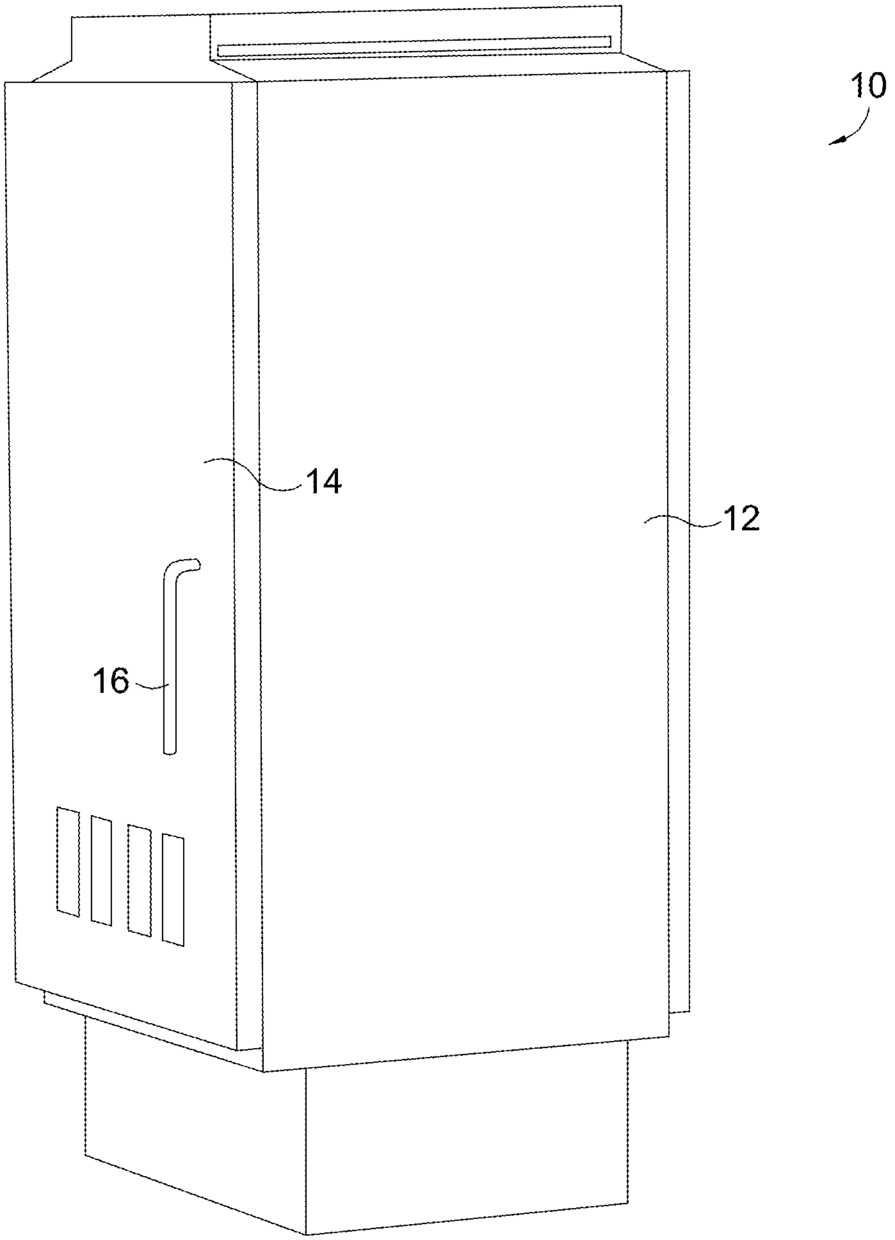
FIG. 1 is an environmental view of a traffic signal control box suitable for use with an embodiment of a cabinet lock in accordance with the present invention.

Corresponding reference characters indicate corresponding parts throughout the several views. The exemplifications set out herein illustrate currently preferred embodiments of the present invention, and such exemplifications are not to be construed as limiting the scope of the invention in any manner.

DESCRIPTION OF THE PREFERRED EMBODIMENTS

Referring to FIGS. 1-4, a traffic signal control box 10 generally includes a cabinet housing 12 defining an open interior. Mounted within the interior are the control boards and related systems and circuitry to control and coordinate traffic lights to manage traffic flow and ease or eliminate traffic congestion. Control box 10 may be powered by the grid and may be enabled for wired or wireless communication with a municipal traffic control agency.

Figure 3:
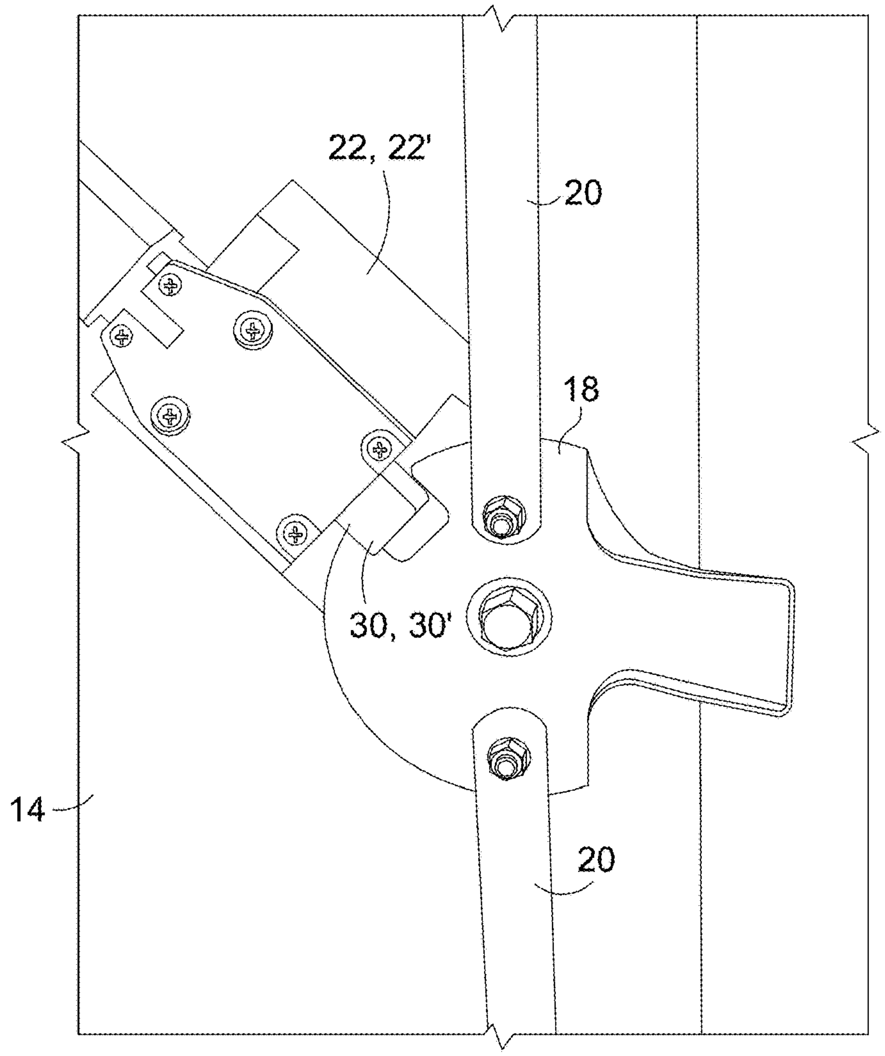
FIG. 3 is an expanded view of a latch member and vertical rod latching device used within the traffic signal control box shown in FIG. 1.
Figure 5:
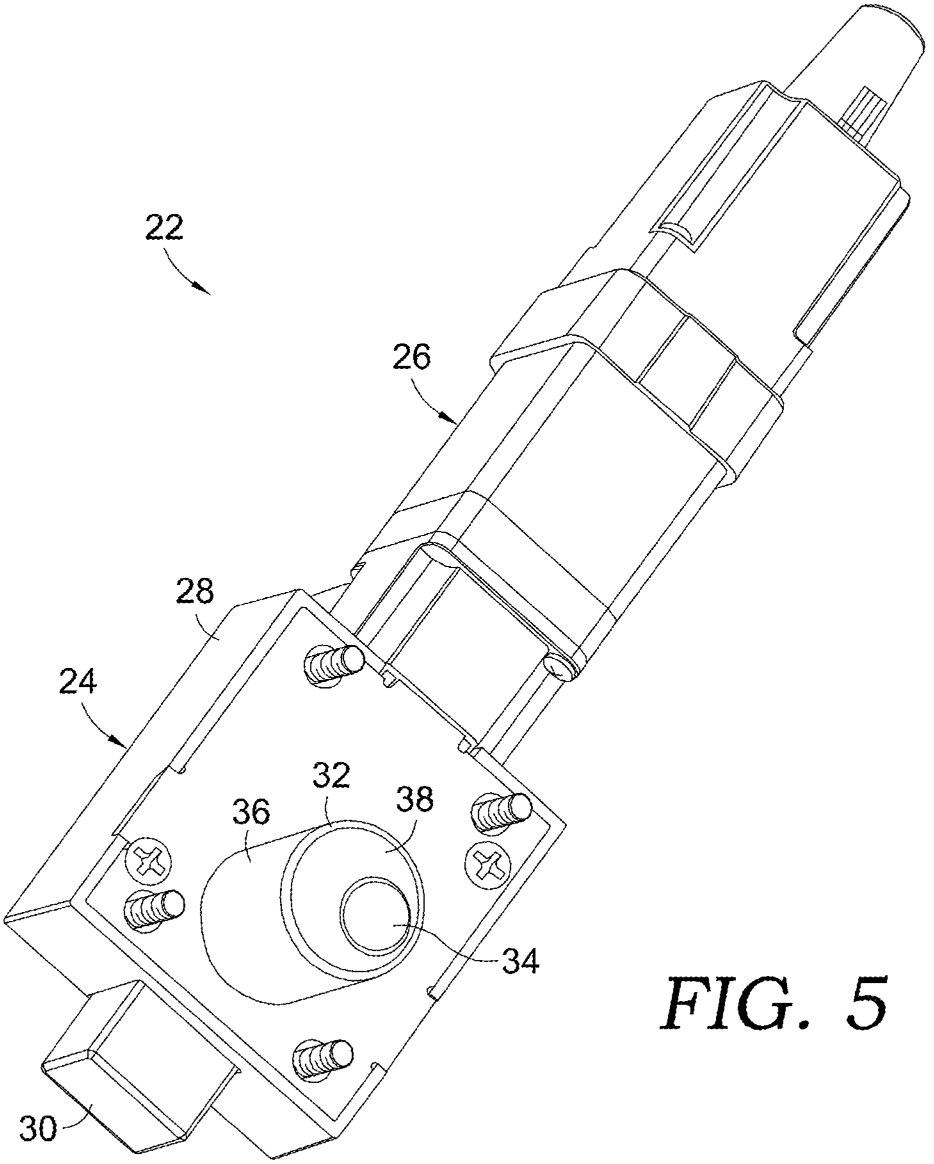
FIG. 5 is a perspective view of an embodiment of a cabinet lock in accordance with the present invention.

A door panel 14 is mounted to cabinet housing 12 and is configured to cover the interior opening when in a closed condition, such as that shown in FIG. 1. In one aspect of the invention, door panel 14 is pivotally mounted to cabinet housing 12 using one or more hinges (not shown) as is generally known in the art. A handle 16 may be included to aid in pivoting door panel 14 from the closed condition to an open condition wherein access to the cabinet interior and equipment therein is gained. Handle 16 may be further coupled to a vertical rod latching device 18 configured to hold door panel 14 in the closed condition (FIG. 3). Handle 16 may be turned to disengage rods 20 from the cabinet housing (compare FIG. 1 having handle 16 in vertical, engaged position, and FIG. 2 having handle 16 turned to a rotated, disengaged position). To prevent unauthorized access to the control box interior and the equipment contained therein, cabinet housing 12 and/or door panel 14 may be provided with a cabinet lock.

Figure 4:
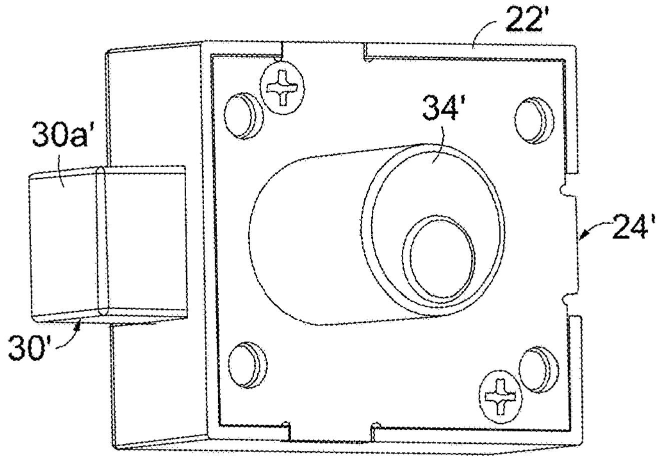
FIG. 4 PRIOR ART
FIG. 4 is a perspective view of a prior art cabinet lock.
Figure 2:
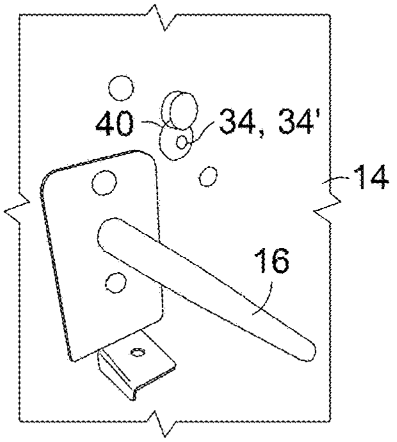
FIG. 2 is an expanded view of a handle and cabinet lock mounted on the traffic signal control box shown in FIG. 1.

With reference to FIG. 4, a prior art cabinet lock 22' may include a latching component 24' having a latch member 30', such as a deadlatch **30*a*', which is configured to engage handle 16 and/or vertical rod latching device 18 so as to prevent turning of the handle 16 when the latch member 30' is in a locked orientation. Cabinet lock 22' includes a key switch 34' whereby, upon insertion of the proper key, key switch 34' may operate to withdraw latch member 30' and disengage latch member 30' from handle 16/vertical rod latching device 18 such that handle 16 may be turned and door panel 14 may be pivoted as described above. As discussed above, while latch member 30' may minimize unauthorized access to control box 10**, access may still occur through manipulation of the latch member, or through unauthorized use of the proper key.

Turning now to FIGS. 5-12, shown is an embodiment of a cabinet lock 22 in accordance with an aspect of the present invention. Cabinet lock 22 is generally comprised of a latching component 24 and electromechanical component 26. Latching component 24 includes a latch housing 28 and a latch member 30 reciprocally translatable therein. Latch member 30 may translate from a locked orientation, such as that shown in FIGS. 5-8, to an unlocked orientation, such as that shown in FIG. 9, as will be discussed in greater detail below. Without limitation thereto, latch member 30 may be a deadbolt or beveled latch or other suitable feature.

Figure 6:
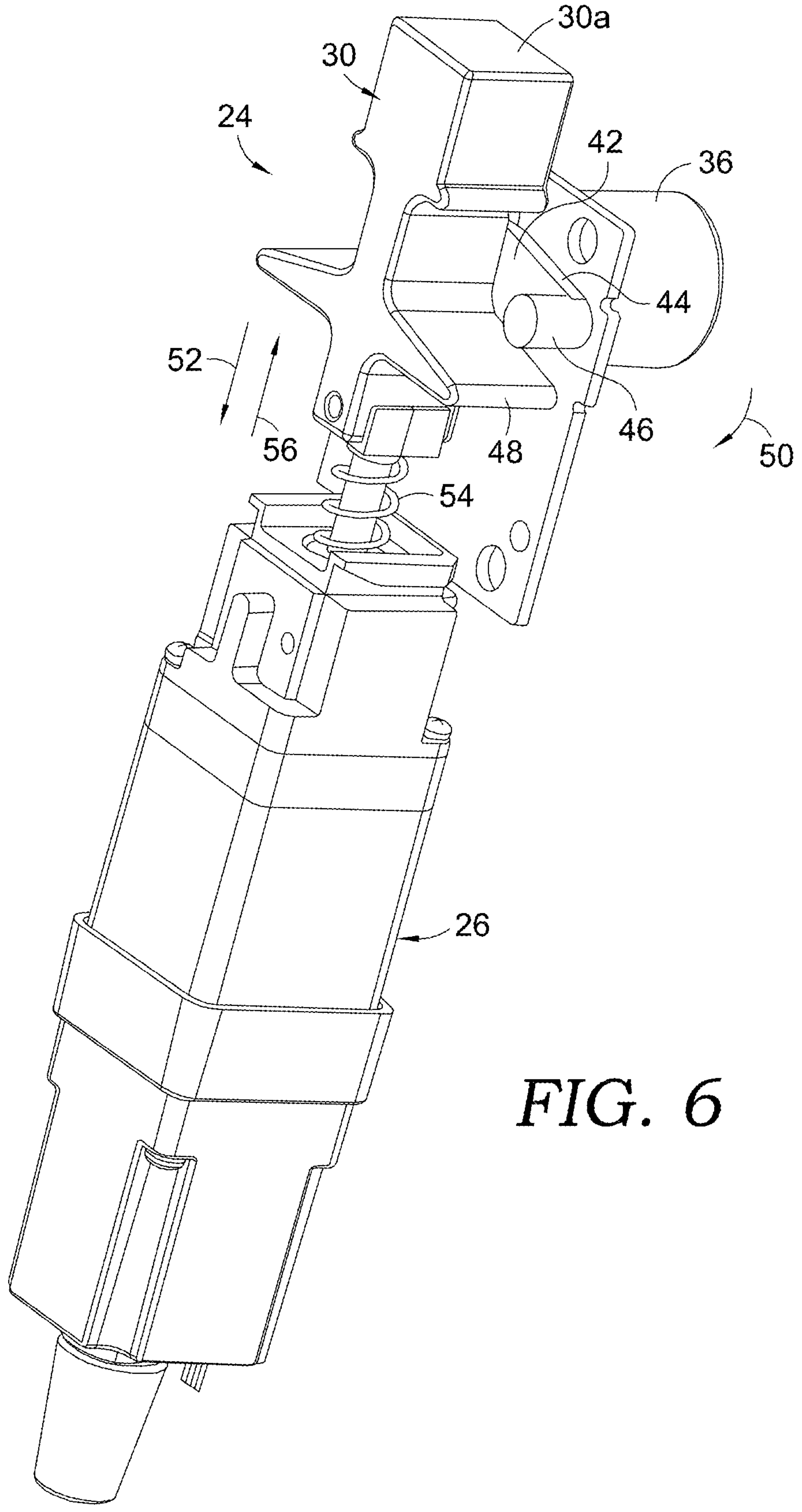
FIG. 6 is a perspective view of the cabinet lock shown in FIG. 5 with the latch housing removed.

Latching component 24 may further include a manual actuator 32, such as a key switch 34. Key switch 34 may include a cylinder 36 having a first end 38 which is configured to receive a key therein. First end 38 may extend outwardly of door panel 14 through an aperture 40 (see e.g., FIG. 2). The opposing second end 42 of cylinder 36 may include a cam member 44. Cam member 44 may further carry a lug 46. Lug 46 is configured to engage latch member 30, such as at wing 48 of latch member 30 as seen in FIG. 6. Turning of a key within cylinder 36 causes cam member 44 and lug 46 to rotate against wing 48, such as in the direction generally indicated by arrow 50, which then drives wing 48 and latch member 30 in an unlocking direction generally indicated by arrow 52. As latch member 30 travels in the unlocking direction, a biasing member 54, such as a spring, is compressed to thereby store potential energy within the spring. Once the turning force applied to the key is removed, the potential energy within spring 54 is released thereby, driving latch member 30 in a locking direction generally indicated by arrow 56. Wing 48 likewise reverse rotates cam member 44 returning cylinder 36 to its initial position as shown in FIG. 6.

Figure 7:
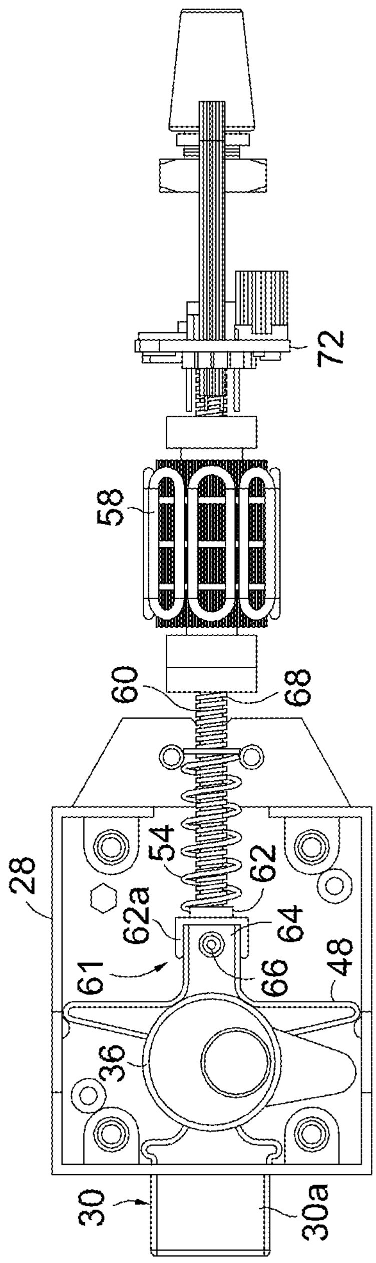
FIG. 7 is a top view of the cabinet lock shown in FIG. 6 with the electromechanical component housing removed.
Figure 8:
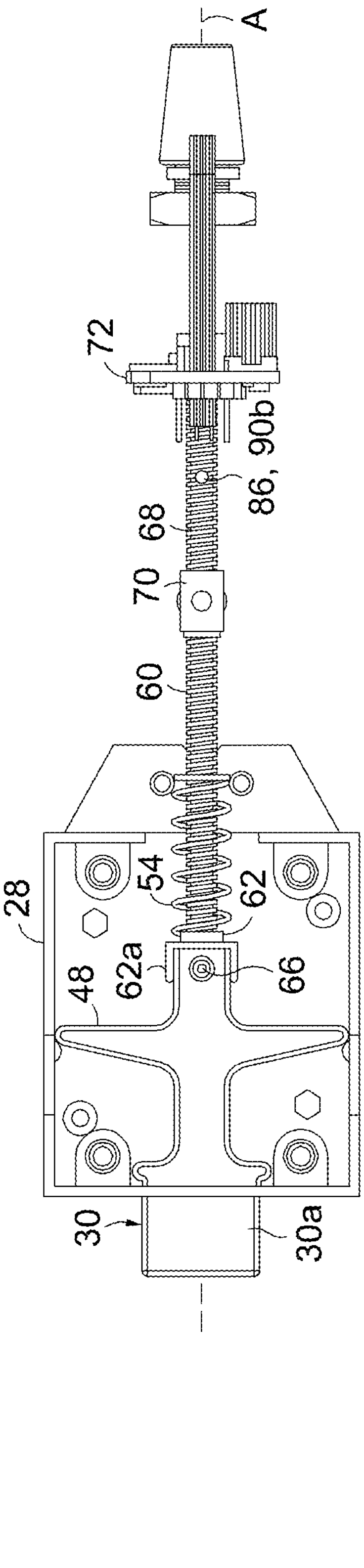
FIG. 8 is a top view of the cabinet lock shown in FIG. 7 with the manual actuator and actuator/motor removed, and with the drive screw and dead bolt in the locked orientation.
Figure 9:
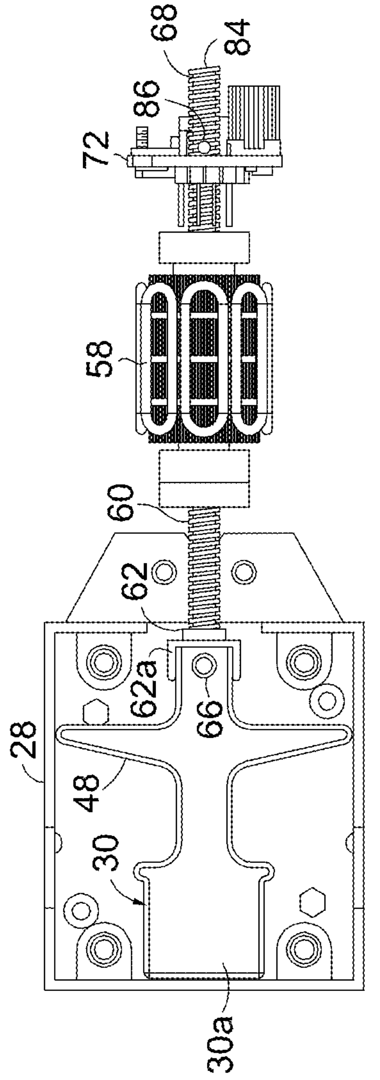
FIG. 9 is a top view of the cabinet lock shown in FIG. 8 with the drive screw and dead bolt in the unlocked orientation.

In addition to, or as an alternative to, manual actuator 32, cabinet lock 22 also includes electromechanical component 26 configured to selectively translate latch member 30. With reference to FIGS. 7 and 8, electromechanical component 26 generally comprises an actuator 58 operably coupled to a drive member 60. Drive member 60 may be a threaded rod 68, such as a motor, as shown. First end 62 of drive member 60 is coupled to latch member 30 whereby powering of actuator 58 retracts drive member 60 and causes latch member 30 to be retracted within latch housing 28 to the unlocked orientation (FIG. 9).

By way of example and without limitation thereto, latch member 30, such as prior art latch member 24' (FIGS. 3 and 4), may be retrofitted with electromechanical component 26 whereby a connecting feature 61 fixedly couples drive member 60 to latch member 30. In the case of the embodiment shown in FIG. 7, connecting feature 61 includes yoke portion **62*a* of drive member 60 and housing end 64 of latch member 30 connected together via fastener 66. Fastener 66 may be any suitable fastening device, such as but not limited to a pin, screw, bolt, rivet or the like. As such, translation of drive member 60 will translate latch member 30**.

In accordance with an aspect of the invention, and in reference to the embodiment shown in FIGS. 5-12, drive member 60 may comprise threaded rod 68 and drive nut 70 rotatably mounted thereon. Drive nut 70 may be rotated by powering of actuator 58 such that rotation (but not translation) of drive nut 70 causes threaded rod 68 to translate (but not rotate) laterally along longitudinal axis A of threaded rod 68. In accordance with an aspect of the present invention, actuator 58 may be powered in a first direction to cause threaded rod 68 and latch member 30 to translate to the unlocked orientation (FIG. 9), and powered in the opposing second direction to cause threaded rod 68 and latch member 30 to return to the locked orientation (FIGS. 7 and 8).

Additionally, or alternatively, biasing member 54 may urge latch member 30 to the locked orientation once power to actuator 58 is removed. By way of example, actuator 58 may be a motor provided with a relatively high current, such as and without limitation thereto, about 250 mA at 24 volts DC, to retract latch member 30 to the unlocked orientation. Once latch member 30 has moved to unlocked orientation (FIG. 9), a hold current of approximately 50 mA may retain latch member 30 in the unlocked orientation. Removing the hold current may allow spring 54 to return latch member 30 to the locked orientation as described above. Alternatively, an opposing current may be provided to actuator 58 to reverse rotate drive nut 70 and reverse translate threaded rod 68.

Figure 10:
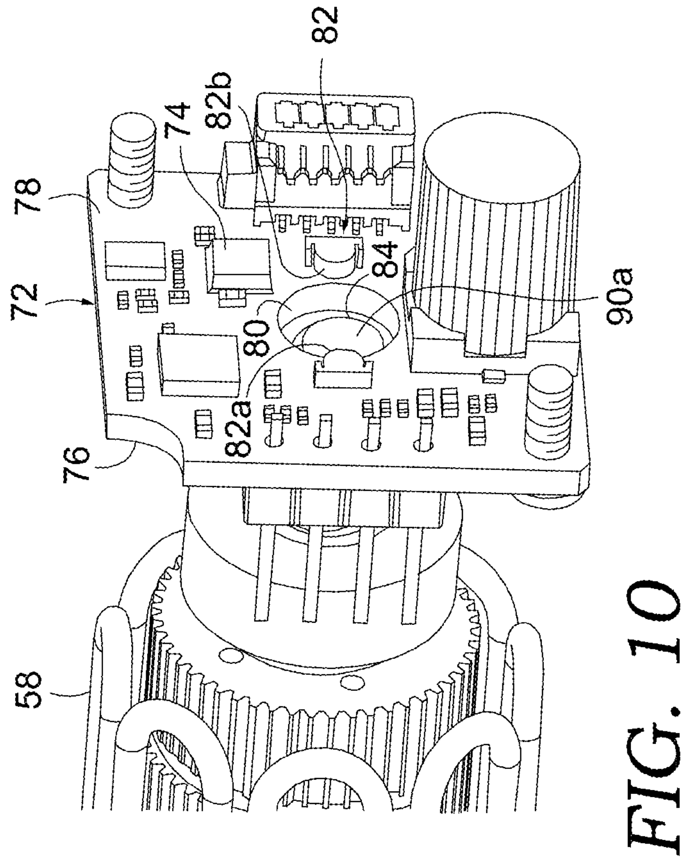
FIG. 10 is a perspective expanded view of a printed circuit board, actuator and drive screw used within the cabinet lock shown in FIG. 5, with the drive screw in the locked orientation.

With reference to FIG. 10, electromechanical component 26 may further include a printed circuit board (PCB) 72. PCB 72 may be configured to receive and send instructions and information with one or more control boards within traffic signal control box 10, which in turn may receive and send information with a municipal traffic control agency. Additionally or alternatively, PCB 72 may include a communication module 74, such as a Bluetooth or other wireless communication module, configured for direct communication with a remote traffic control agency. PCB 72 may send control signals to power actuator 58 and may also send information regarding lock status as will be described in greater detail below. Still further, communication module 74 may be configured to receive control signals from a utilities worker located onsite through a wireless communication signal, thereby foregoing the need for a physical key for use with cylinder 36.

In accordance with the invention, a latch position sensor may be provided to enable remote detection of the latch status of cabinet housing 12. Referring once again to the embodiment shown in FIGS. 7-12, PCB 72 may include a forward surface 76 and a rearward surface 78. An aperture 80 may pass through PCB 72 from forward surface 76 to rearward surface 78. Located proximate aperture 80 on rearward surface 78 may be a drive member position sensor 82. In one aspect of the invention, position sensor 82 may comprise a photoemitter/detector pair **82*a*, 82*b* configured for line-of-sight detection. For example, photoemitter 82*a* may emit a beam of light which is detected by detector 82*b*. Position sensor 82** will then trigger a signal when the beam of light is interrupted/blocked, as will be discussed in greater detail below. Still further, the photoemitter may be an optical infrared emitter, although other position sensors may be used, such as and without limitation thereto, a Hall Effect sensor, a linear variable differential transformer or rotary encoder.

Working in conjunction with photo emitter/detector pair **82*a*, 82*b*, is a photo beam interrupter 90*a*, 90*b* conjured to move with movement of latch member 30 and to selective block and unblock the energy beam between photo emitter a and photo detector 82*b*. In the case of the embodiment shown in FIGS. 8-12, photo beam interrupter 90*a*, 90*b* includes terminal end 84 (90*a*) of drive member 60 and aperture 86 (90*b*). As shown in FIG. 10, drive member 60 is coaxially aligned with aperture 80, with terminal end 84 of drive member 60 located near or even with the plane defined by forward surface 76 while latch member 30 is in the locked orientation. In no event will terminal end 84 extend completely through aperture 80 and beyond the plane defined by rearward surface 78 while latch member 30** is in the locked orientation.

Figure 11:
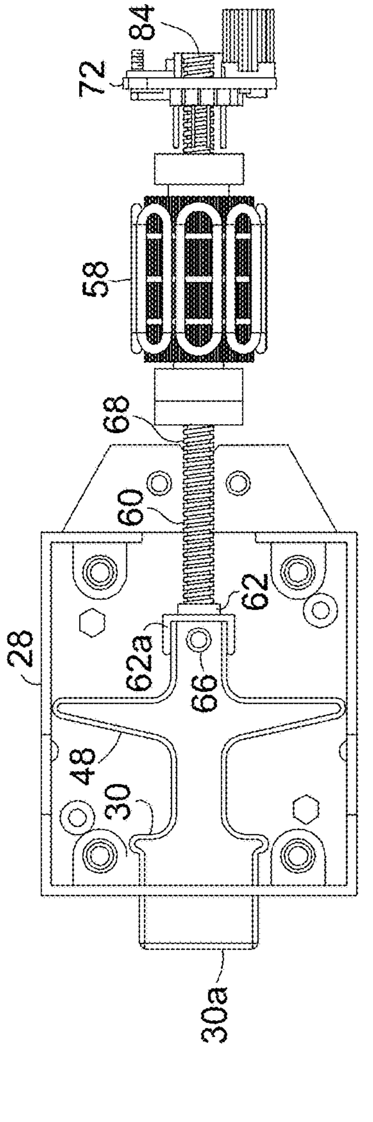
FIG. 11 is a top view of the cabinet lock shown in FIG. 8 with the drive screw and dead bolt intermediate the locked orientation and the unlocked orientation.
Figure 12:
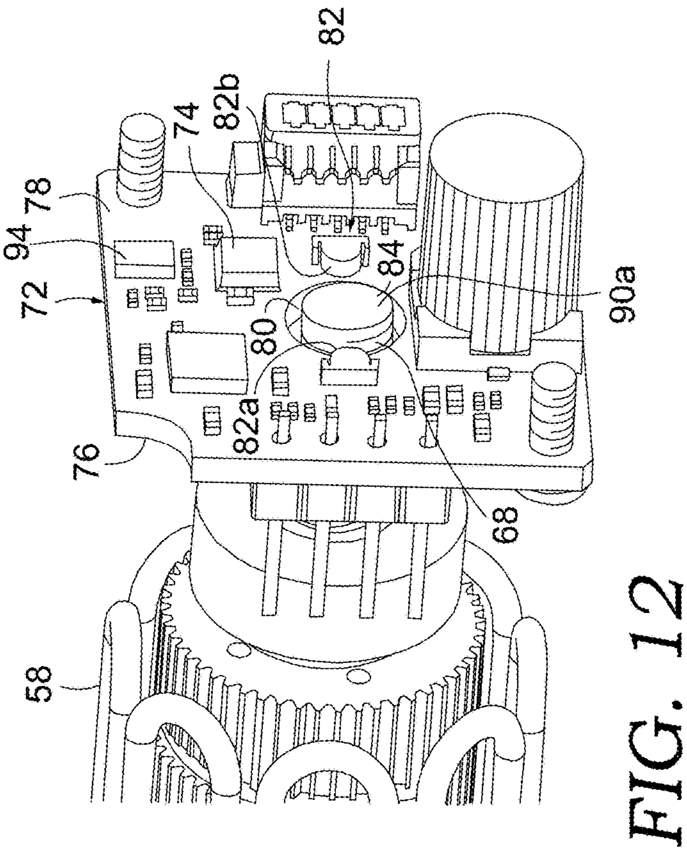
FIG. 12 is a perspective expanded view of the printed circuit board, actuator and drive screw within the cabinet lock shown in FIG. 11.
Figure 13:
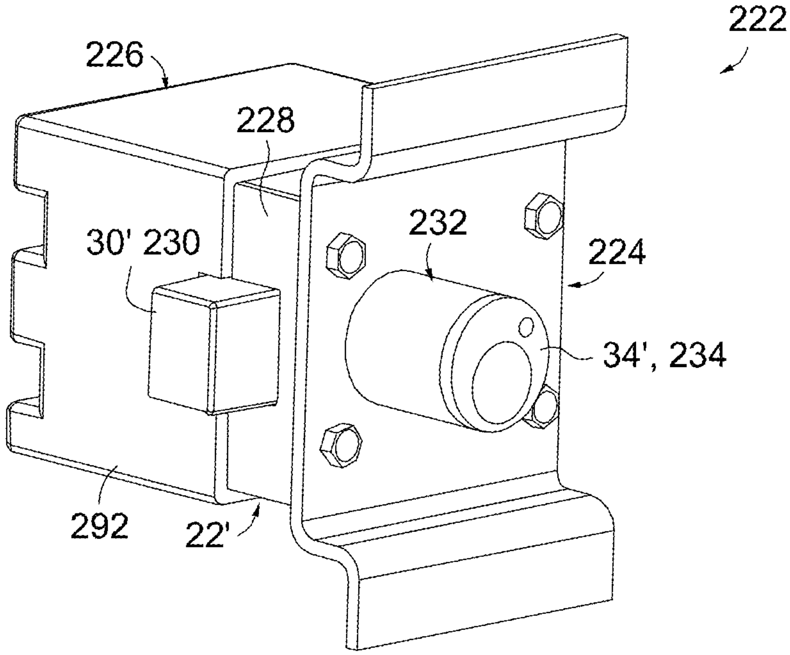
FIG. 13 is a front perspective view of yet alternative embodiment of a cabinet lock in accordance with the present invention.
Figure 14:
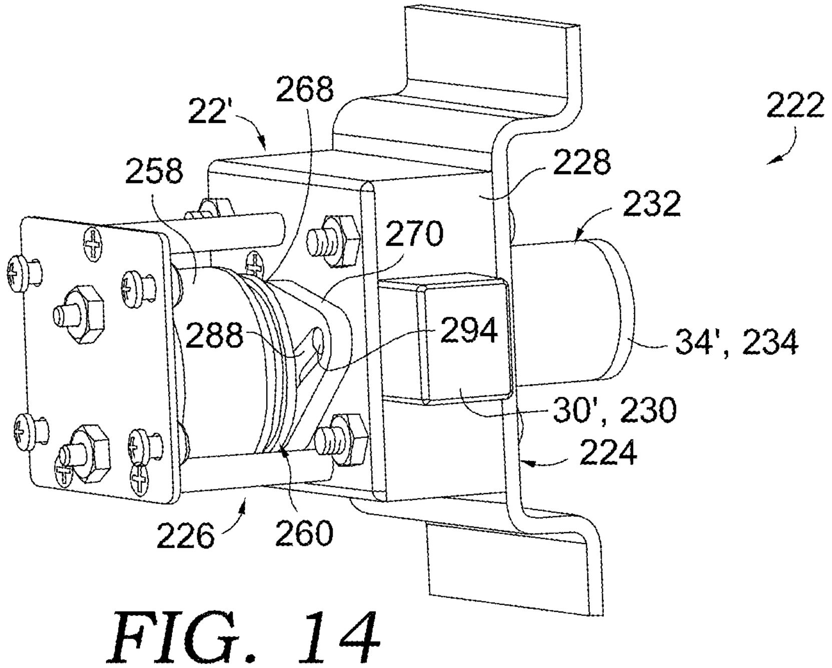
FIG. 14 is a rear perspective view of the alternative embodiment of a cabinet lock shown in FIG. 13 with the electromechanical component housing removed.

Turning now to FIGS. 11 and 12, latch member 30 is shown in an intermediate state between the locked orientation (FIGS. 7 and 8) and the unlocked orientation (FIG. 9), such as through a partial turning of the key within cylinder

36 or supplying of a high retract current to actuator 58. In either event, drive member 60 translates laterally while drive nut 70 is rotated as described above. As a result, terminal end 84 of drive member 60 (i.e., interrupter 90*a*) travels in and through aperture 80 within PCB 72. Drive member 60 then interrupts the line-of-sight beam of position sensor 82 thereby causing position sensor 82 to trigger a signal. This signal is then, ultimately, communicated to the municipal traffic control agency and/or utility employee signaling that latch member 30 is being translated from the locked orientation to the unlocked orientation. Thus, the municipal traffic control agency can verify whether an attempted access to traffic signal control box 10 is authorized or not. Should the attempt be unauthorized, additional safety measures may be taken, such as alerting local law enforcement or triggering video and/or audio data collection to assist in identifying the unauthorized individual.

There may be a further need to detect and signal when latch member 30 has reached its fully retracted position. For this purpose aperture 86 passing through drive member 60 may be formed at a distance from terminal end 84 of the drive member (see FIGS. 8 and 9). As drive member 60 continues its translation from the locked orientation and reaches the unlocked orientation, aperture 86 aligns with the line-of-sight beam of position sensor 82. In doing so, the line-of-sight beam transmitted by photoemitter 82*a* is again allowed to pass through aperture 86 (interrupter 90*b*) and reach detector 82*b*. A signal created upon renewed receipt of the beam by detector 82*b* may be communicated to the municipal traffic control agency that latch member 30 is in its unlocked orientation and that the interior of control box 10 has become accessible.

Thus, the above described embodiments for remotely detecting latch status provides means by which the municipal traffic control agency may verify whether an attempted access to traffic control box 10 is authorized or not. Should the attempt be unauthorized, additional safety measures may be taken, such as alerting local law enforcement or triggering video and/or audio data collection to assist in identifying the unauthorized individual.

Moreover, by using an optical sensor or photo-emitter sensor for position sensor 82 as described above, the sensing device would be impervious to expected temperature extremes and electromagnetic interferences.

Figure 19:
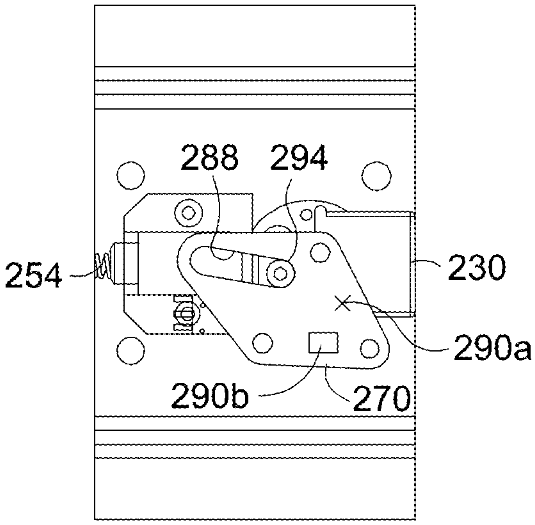
FIG. 19 is a rear view of the alternative embodiment of a cabinet lock shown in FIG. 13 showing the latch in an unlocked orientation.

Turning now to FIGS. 13-19, an alternative embodiment of a cabinet lock 222 may generally comprise a latching component 224 and electromechanical component 226. Similar to latching components 24 described above, latching component 224 includes a latch housing 228 and a latch member 230 reciprocally translatable therein between a locked orientation (FIGS. 13-17) and an unlocked orientation (FIG. 19). Without limitation thereto, latch member 230 may be a deadbolt or beveled latch or other suitable feature. Latching component 224 may further include a manual actuator 232, such as a key switch 234 described above with regard to key switch 34, the operation of which is identical as recited previously. Electromechanical component 226 is configured to selectively translate latch member 230.

Electromechanical component 226 generally includes an actuator 258 operably coupled to a drive member 260; actuator 258 may be a rotary actuator 268. Drive member 260 may be drive plate 270. Drive member 260 includes a guide channel 288 configured to receive a latch pin 294 on latch member 230 which extends from latch housing 228 into drive housing 292.

Figure 17:
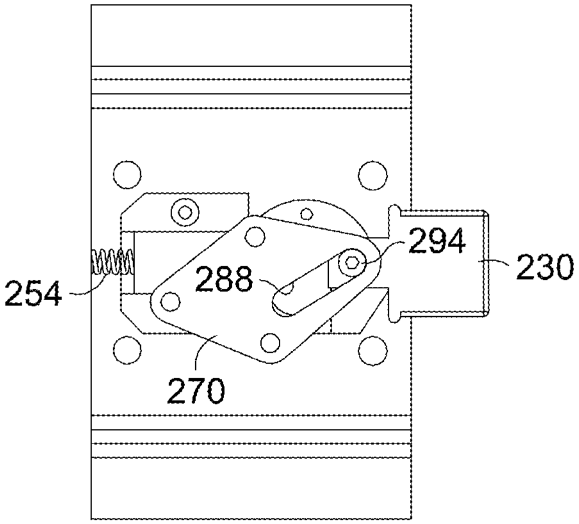
FIG. 17 is a rear view of the alternative embodiment of a cabinet lock shown in FIG. 13 showing the latch in a locked orientation.
Figure 18:
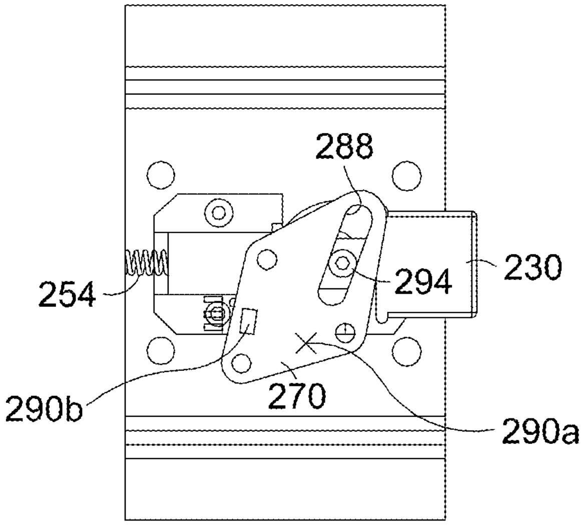
FIG. 18 is a rear view of the alternative embodiment of a cabinet lock shown in FIG. 13 showing the latch in an intermediate orientation.

With additional reference to FIGS. 13-19, drive member 260 is configured to engage latch pin 294 such that rotation of drive plate 270 via actuator 258 causes translation of latch pin 294, and subsequent translation of latch member 230. Actuator 258 may be powered in a first direction to cause drive member 260 and latch pin 294 to translate latch member 230 from a locked orientation (FIG. 17) through an intermediate orientation (FIG. 18) to the unlocked orientation (FIG. 19). Powering of actuator 258 in the opposing second direction may cause drive member 270, latch pin 294 and latch member 230 to return to their respective locked orientations (FIG. 17). Additionally, or alternatively, biasing member 254, such as a spring, within latch housing 228 may urge latch member 230 to the locked orientation once power to actuator 258 is removed.

Figure 15:
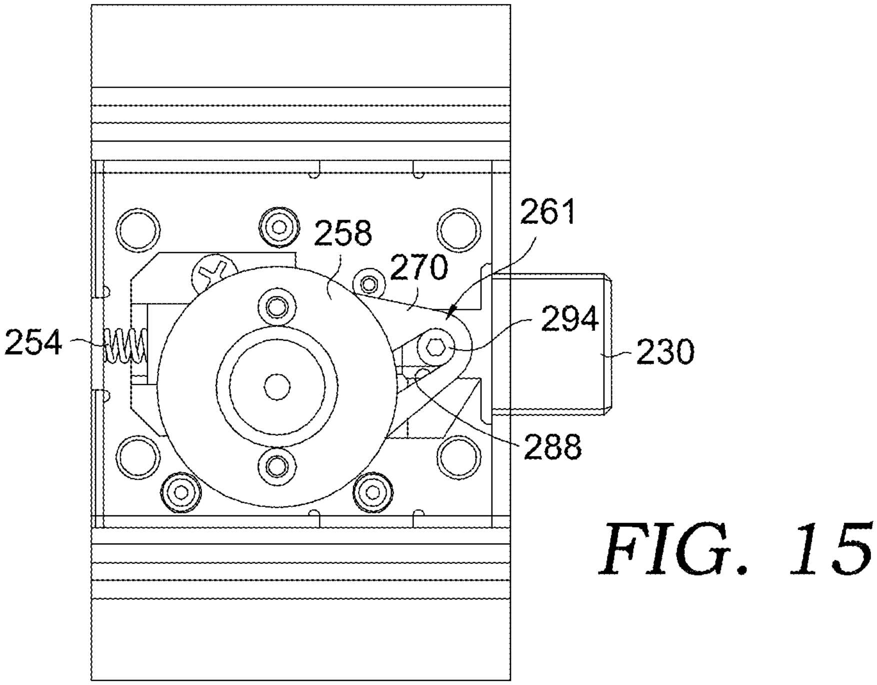
FIG. 15 is a rear of the alternative embodiment of a cabinet lock shown in FIG. 13.
Figure 16:
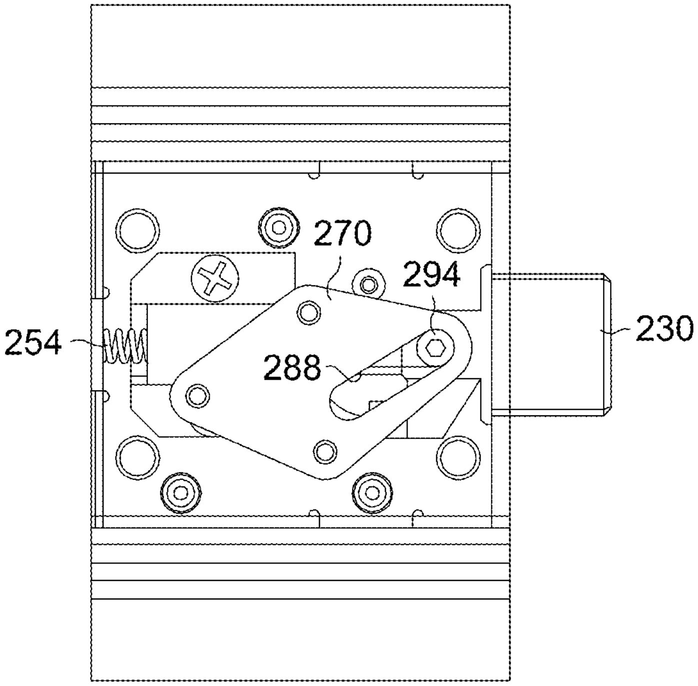
FIG. 16 is a rear view of the alternative embodiment of a cabinet lock shown in FIG. 15 with the manual actuator and actuator/motor removed.

In accordance with an aspect of the present invention, electromechanical component 226 may be configured to retrofit an existing cabinet lock, such as cabinet lock 22' including latch member 30' and key switch 34' as described above with regard to FIG. 4, whereby a connecting feature 261 fixedly couples electromechanical component 226 to latching component 224. In the case of the embodiment shown in FIG. 15, connecting feature 261 may include guide channel 288 of drive member 260 and latch pin 294 connected to latch member 230 (FIG. 15).

Electromechanical component 226 may also be configured with a latch position sensor using a photo emitter/detector pair as described above. In the case of the embodiment shown in FIGS. 17-19, photo beam interrupter may include a surface 290*a* of drive member 260 to block transmission of the line-of-sight beam transmitted by photo emitter when the latch is in a first position (FIG. 18), and a through orifice 290*b* in drive member 260 strategically placed to allow transmission of the line-of-sight beam to the photo detector when the latch moves to a second position. For example, the first position of the latch may be when the latch is an intermediate latch position (FIG. 18) and the second position may be when the latch is fully retracted (FIG. 19) to allow entry into control box 10.

Turning now to FIGS. 20-23, another alternative embodiment of a cabinet lock 422 may generally comprise a latching component 424 and electromechanical component 426. Similar to latching component 24 described above, latching component 424 includes a latch housing 428 and a latch member 430 reciprocally translatable therein between a locked orientation and an unlocked orientation. Without limitation thereto, latch member 430 may be a deadbolt or beveled latch or other suitable feature. Latching component 424 may further include a manual actuator 432, including a key switch 434 described above with regard to key switch 34, the operation of which is identical as recited previously. Electromechanical component 426 is configured to selectively translate latch member 430.

Figure 20:
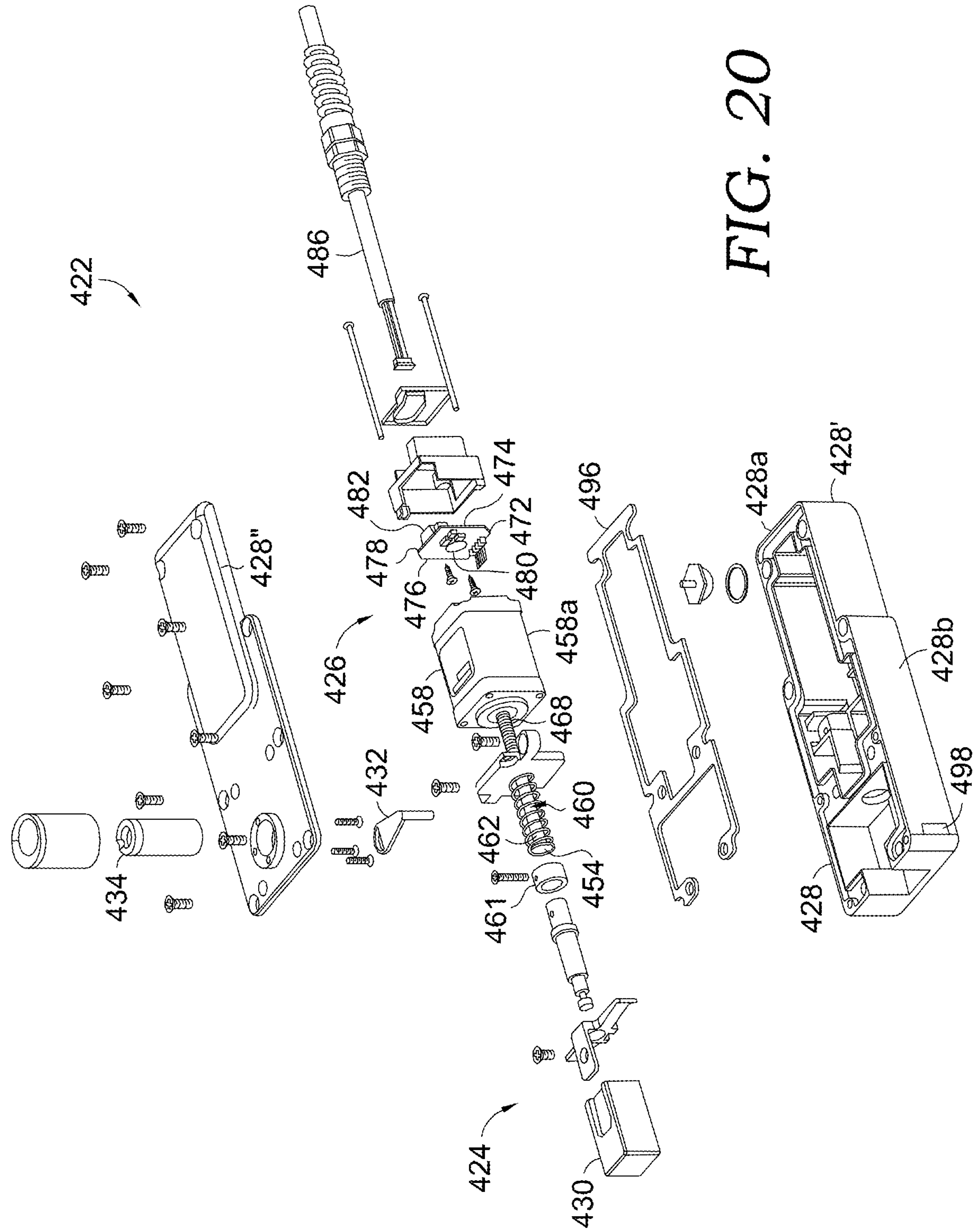
FIG. 20 is an exploded view of another embodiment of a cabinet lock in accordance with the present invention.
Figure 21:
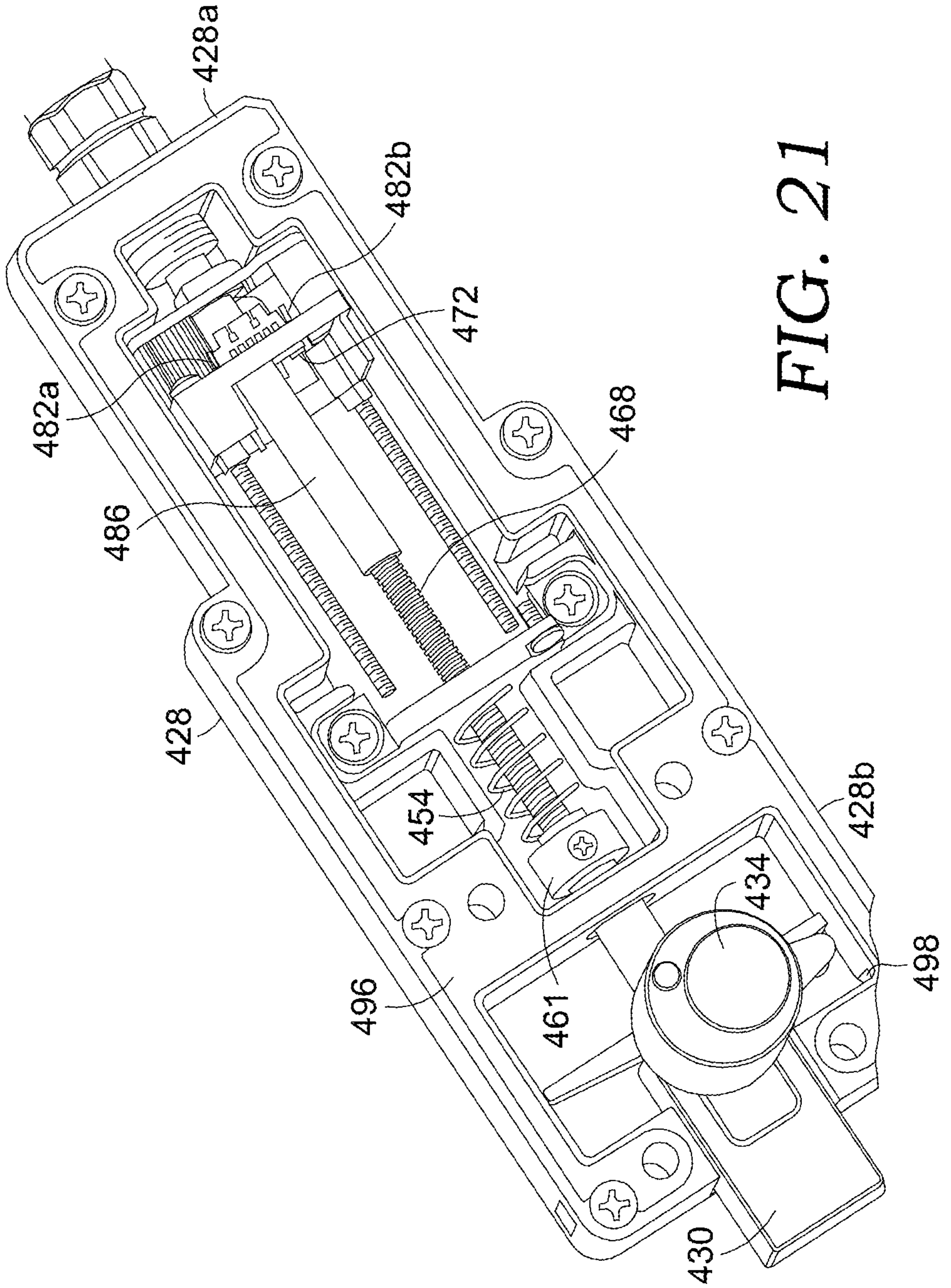
FIG. 21 is a top perspective view of the alternative embodiment of a cabinet lock shown in FIG. 20 with the latch housing cover plate removed.
Figure 22:
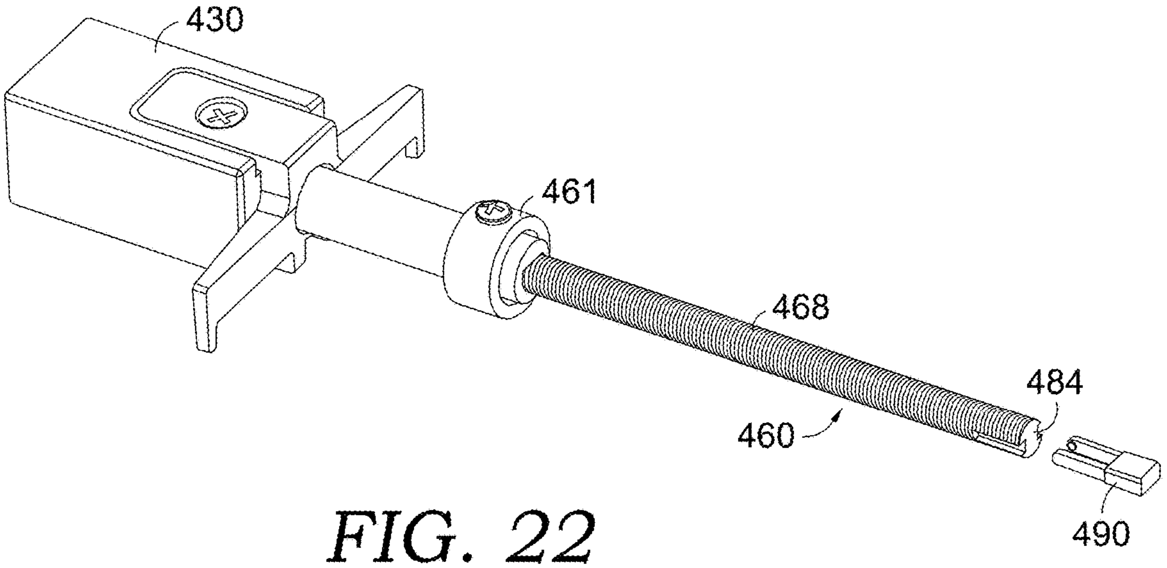
FIG. 22 is an isolated view of the latch member and drive member of the alternative embodiment of a cabinet lock shown in FIG. 20.

With reference to FIGS. 20-22, electromechanical component 426 generally comprises an actuator 458, operably coupled to a drive member 460. Drive member 460 may include a threaded rod 468, as shown. First end 462 of drive member 460 is coupled to latch member 430 whereby powering of actuator 458 retracts drive member 460 and causes latch member 430 to be retracted within latch housing 428 to the unlocked orientation.

In accordance with an aspect of the invention, biasing member 454 may urge latch member 430 to the locked orientation once power to actuator 458 is removed. By way of example, actuator 458 may be a motor provided with a relatively high current, such as and without limitation thereto, about 250 mA at 24 volts DC, to retract latch member 430 to the unlocked orientation. Once latch member 430 has moved to unlocked orientation, a hold current of approximately 50 mA may retain latch member 430 in the unlocked orientation. Removing the hold current may allow spring 454 to return latch member 430 to the locked orientation as described above. Alternatively, an opposing current may be provided to actuator 458 to reverse translate threaded rod 468.

With reference to FIGS. 20 and 21, electromechanical component 426 may further include a printed circuit board (PCB) 472. PCB 472 may be configured to receive and send instructions and information with one or more control boards within traffic signal control box 10, which in turn may receive and send information with a municipal traffic control agency. Additionally or alternatively, PCB 472 may include a communication module 474, such as a Bluetooth or other wireless communication module, configured for direct communication with a remote traffic control agency. PCB 472 may send control signals to power actuator 458 and may also send information regarding lock status as will be described in greater detail below. Still further, communication module 474 may be configured to receive control signals from a utilities worker located onsite through a wireless communication signal, thereby foregoing the need for a physical key for use with, for example, cylinder 36.

In accordance with the invention, a latch position sensor may be provided to enable remote detection of the latch status of cabinet housing 12. With continued reference to FIGS. 20 and 21, PCB 472 may include a forward surface 476 and a rearward surface 478. An aperture 480 may pass through PCB 472 from forward surface 476 to rearward surface 478. Located proximate aperture 480 on rearward surface 478 may be a drive member position sensor 482. In one aspect of the invention, position sensor 482 may comprise a photo emitter/detector pair 482*a*, 482*b* configured for line-of-sight detection. For example, photo emitter 482*a* may emit a beam of light (such as but not limited to visible and/or infrared (IR) radiation, i.e., an optical infrared emitter) which is detected by detector 482*b*. Position sensor 482 will then trigger a signal when the beam of light is interrupted/blocked, as will be discussed in greater detail below. It should be further noted that other position sensors may be used, such as and without limitation thereto, a Hall Effect sensor, a linear variable differential transformer or rotary encoder.

Figure 23:
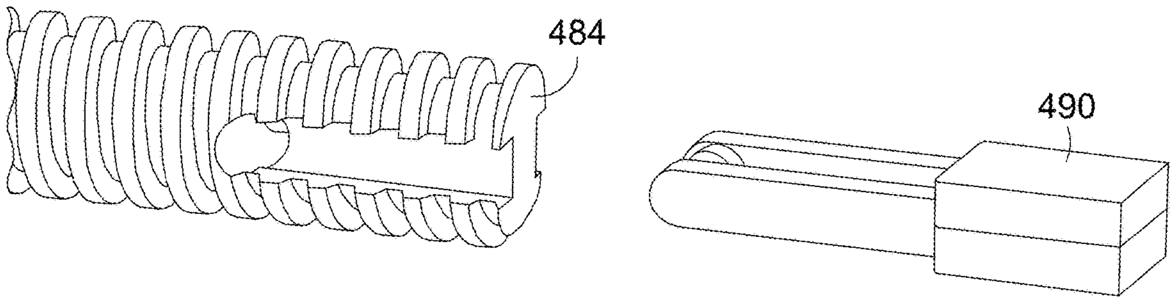
FIG. 23 is an expanded view of the drive member and photo beam interrupter shown in FIG. 22.

With further reference to FIGS. 22 and 23, working in conjunction with photo emitter/detector pair 482*a*, 482*b*, is a photo beam interrupter 490 configured to move with movement of latch member 430 and to selectively intercept the beam of light between photo emitter 482*a* and photo detector 482*b*. In the case of the embodiment shown in FIGS. 20-23, photo beam interrupter 490 may be coupled to or otherwise includes terminal end 484 of drive member 460. As shown in FIGS. 20-22, drive member 460 is coaxially aligned with aperture 480, with terminal end 484 of drive member 460 located near or even with the plane defined by forward surface 476 while latch member 430 is in the locked orientation. In one aspect of the present invention, drive member 460 may be received within guide sleeve 486 which may extend from rear wall 428*a* of latch housing 428 to an intermediate distance within housing 458*a* of actuator 458.

In accordance with an aspect of the present invention, guide sleeve 486 is constructed of a material configured to be transparent to the radiation emitted by photo emitter 482*a*. As a result, photo detector 482*b* detects an unhindered light beam when latch member 430 is in a locked orientation which manifests as a first signal that may be communicated to the municipal traffic control agency and/or utility employee. Photo beam interrupter 490 may then be fabricated from a translucent material whereby photo detector 482*b* detects a modified light beam which manifests as a second signal communicated to the municipal traffic control agency and/or utility employee. Drive member 460 may then be fabricated from an opaque material which manifests as a third signal communicated to the municipal traffic control agency and/or utility employee.

Figure 24:
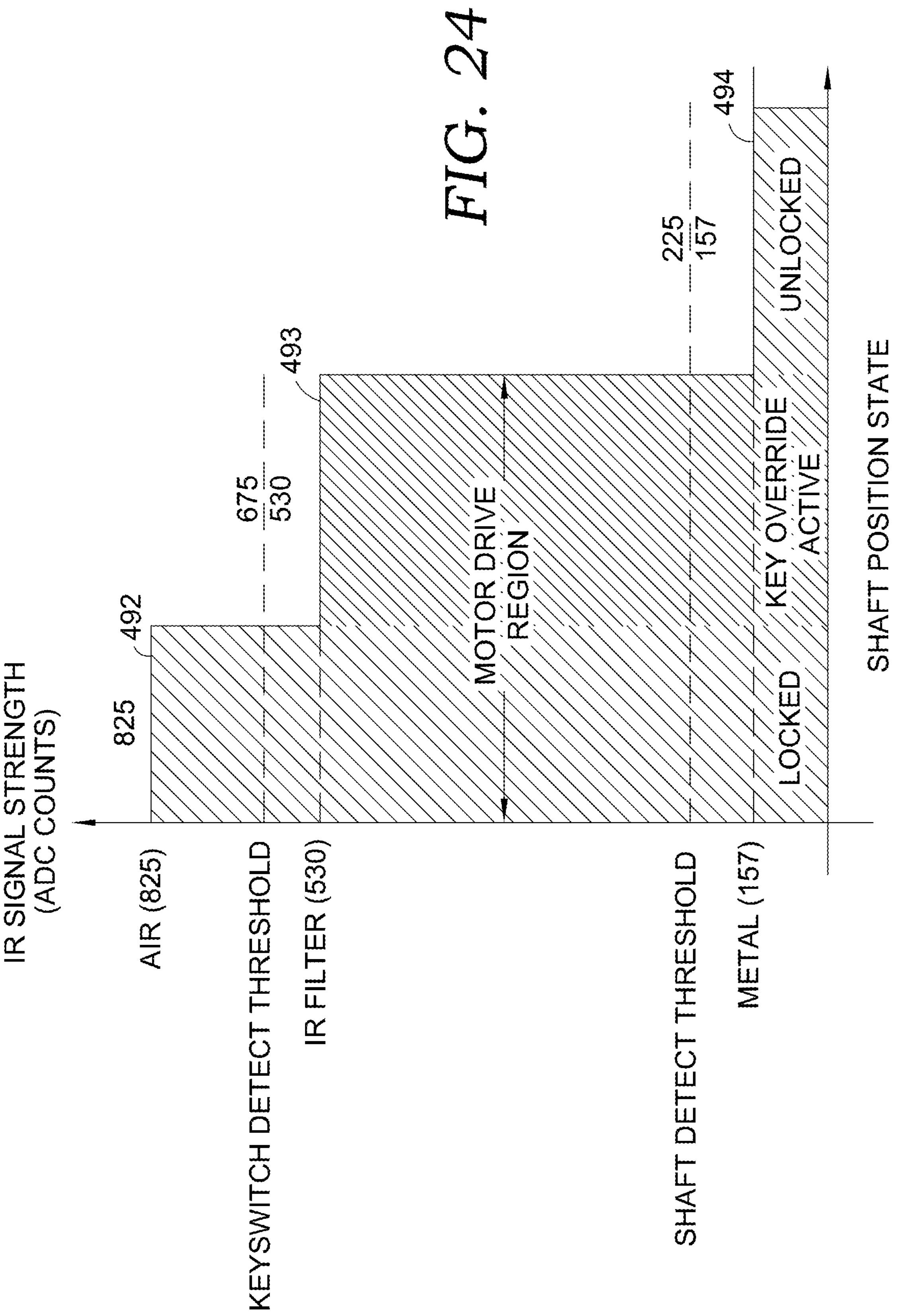
FIG. 24 is a plot showing IR signal strength as a function of drive member position for an exemplary drive member and photo beam interrupter in accordance with an aspect of the present invention.

With additional reference to FIG. 24, in one aspect of the invention, the first signal 492 may indicate that latch 430 is in the locked orientation while the third signal 494 indicates that latch 430 is in the unlatched orientation. Photo beam interrupter 490 (and its resultant modified light beam) may then be selected to have a length whereby the second signal 493 indicates that latch member 430 has been moved from its fully latched orientation to a position prior to its unlatched orientation. As the second signal 493 is communicated to the municipal traffic control agency, the municipal traffic control agency can verify whether an attempted access to traffic signal control box 10 is authorized or not. Should the attempt be unauthorized, additional safety measures may be taken, such as alerting local law enforcement or triggering video and/or audio data collection to assist in identifying the unauthorized individual and/or initiating a lock-out protocol whereby further movement of latch 430 is arrested and admission to traffic control box 10 is prevented.

It should be noted that, while photo beam interrupter 490 has been shown and described as being fabricated from a single material having a consistent translucency, in a further aspect of the present invention, photo beam interrupter 490 may alternatively be formed so as to define a plurality of stratified sub-regions wherein each sub-region has a different degree of translucency. Thus, second signal 493 may be delineated into a series of smaller signals, whereby photo detector 482*b* may sequentially emit each signal to communicate to serial movement of latch member 430 to the municipal traffic control agency.

Figure 25:
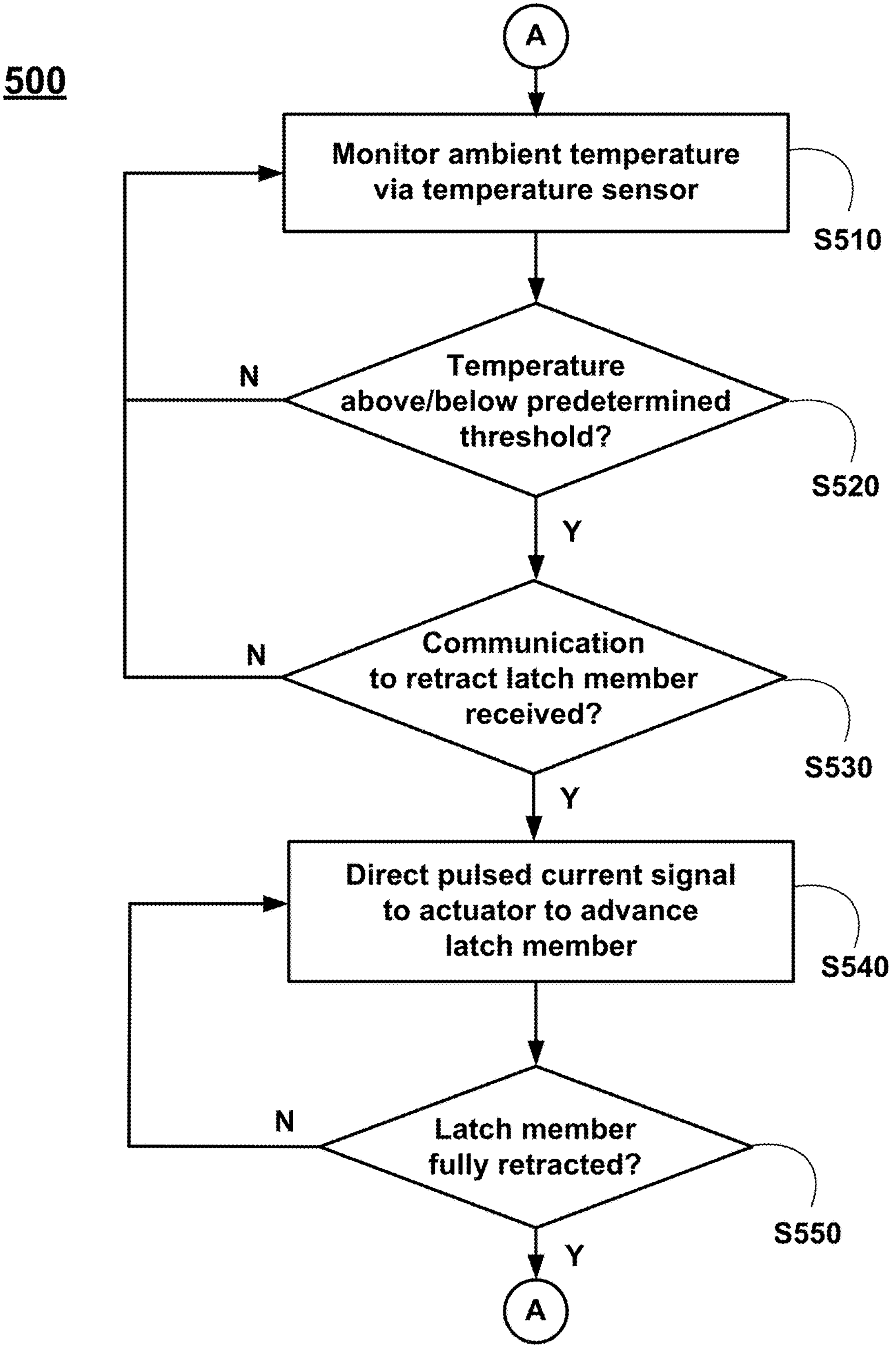
FIG. 25 is a flow chart of a method for powering an actuator of a cabinet lock based on a sensed temperature in accordance with an aspect of the present invention.

In cold climates, latch member movement between locked and unlocked orientations is known to become sluggish or, under extreme temperature conditions, inoperative. With reference to FIGS. 25-29, sluggish or inoperative latch member 30, 230, 430 movement caused by these conditions may be remedied by directing an instantaneous, pulsed current signal to actuator 32, 232, 432 to advance latch member 30, 230, 430. With respect to cabinet locks 22, 222 and 422, a further embodiment may include a temperature sensor 94 for sensing ambient temperatures within respective latch housing 28, 228 and 428. Temperature sensor 94, may be located on the PCB 72, 472 (see FIG. 12 for example) or anywhere within or near latch housing 28, 228, 428. Accordingly, as shown in FIG. 25, an exemplary method 500 for powering an actuator of a cabinet lock based on a sensed temperature is provided. For instance, PCB 72, 472 monitors an ambient temperature associated with or in the vicinity of cabinet lock 22, 222, 422 using temperature sensor 94 at step S510. Upon detection of a temperature above or below a predetermined threshold temperature by sensor 94 at step S520, and further upon receipt of communication by PCB 72, 472 to retract latch member 30, 230, 430 to an unlocked orientation from the remote traffic control agency or local utilities worker at step S530, a pulsed current signal may be directed to actuator 32, 232, 432 by PCB 72, 472 to advance movement of latch member 30, 230, 430 to the unlocked orientation at step S540. For each period of a given unlocking cycle, PCB 72, 472 may further detect whether latch member 30, 230, 430 is fully retracted to the unlocked orientation at step S550 using position sensor 482, for example. If latch member 30, 230, 430 is not detected as being in the unlocked orientation, method 500 may return to S540 and continue directing a pulsed current signal to actuator 32, 232, 432 in an attempt to move latch member 30, 230, 430 to the unlocked orientation. If PCB 72, 472 detects that latch member 30, 230, 430 has reached the unlocked orientation, method 500 may end or cycle back to step S510.

Although not illustrated in FIG. 25, it should be appreciated that in the event the sensed temperature is not above or below the predetermined threshold temperature value (e.g., the ambient temperature is within a nominal or normal operating range), directing of a pulsed current signal and/or adjustment of motor drive parameters may not be needed to advance movement of latch member 30, 230, 430, and thus PCB 472 will ordinarily drive actuator 32, 232, 432 according to regular current signal and/or a set of standard or default motor drive parameters upon receiving a command to retract latch member 30, 230, 430.

Figure 26:
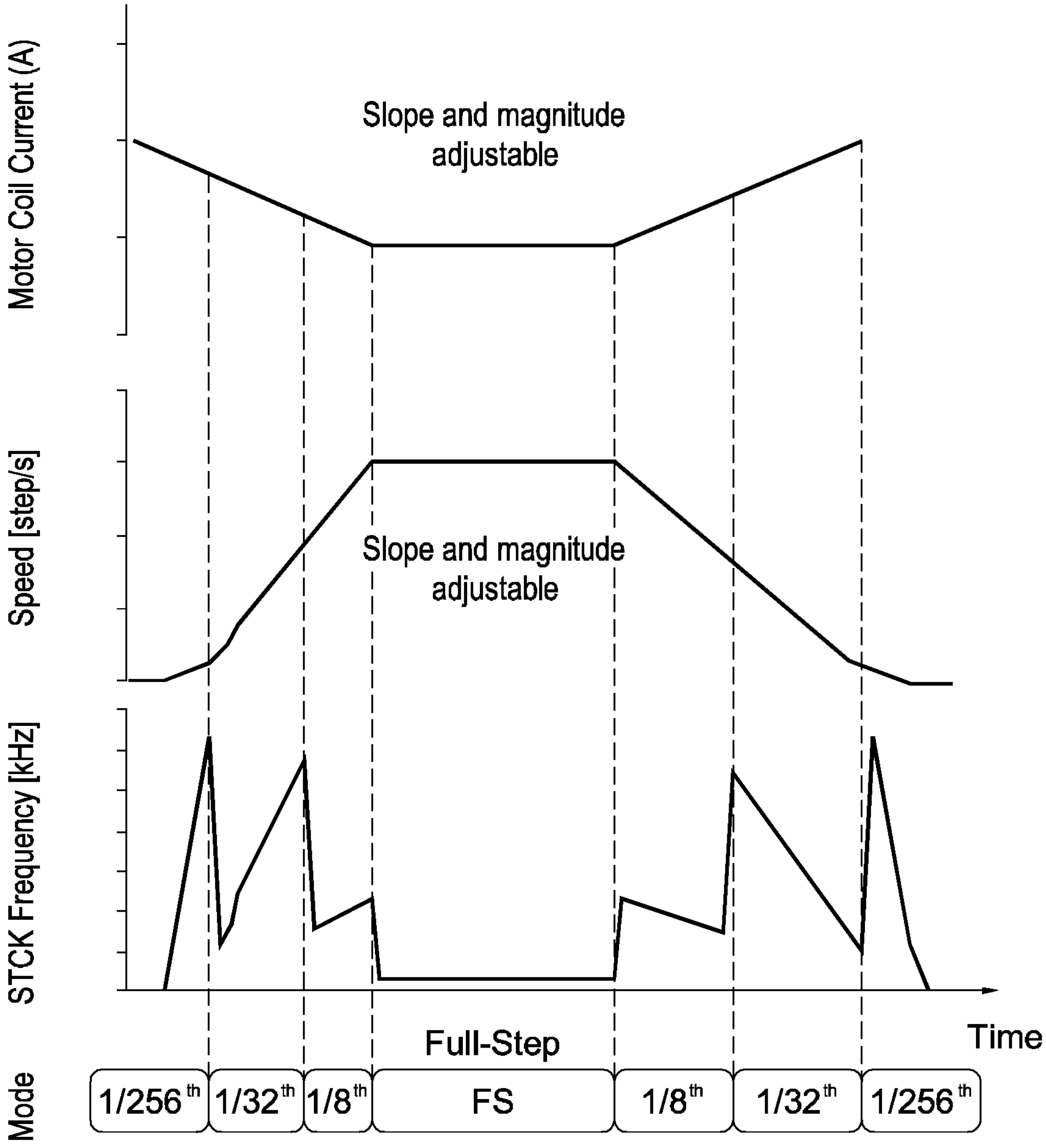
FIG. 26 is an exemplary diagram illustrating how a motor drive profile for powering the actuator can be controlled and/or individual drive parameters can be dynamically adjusted.
Figure 27:
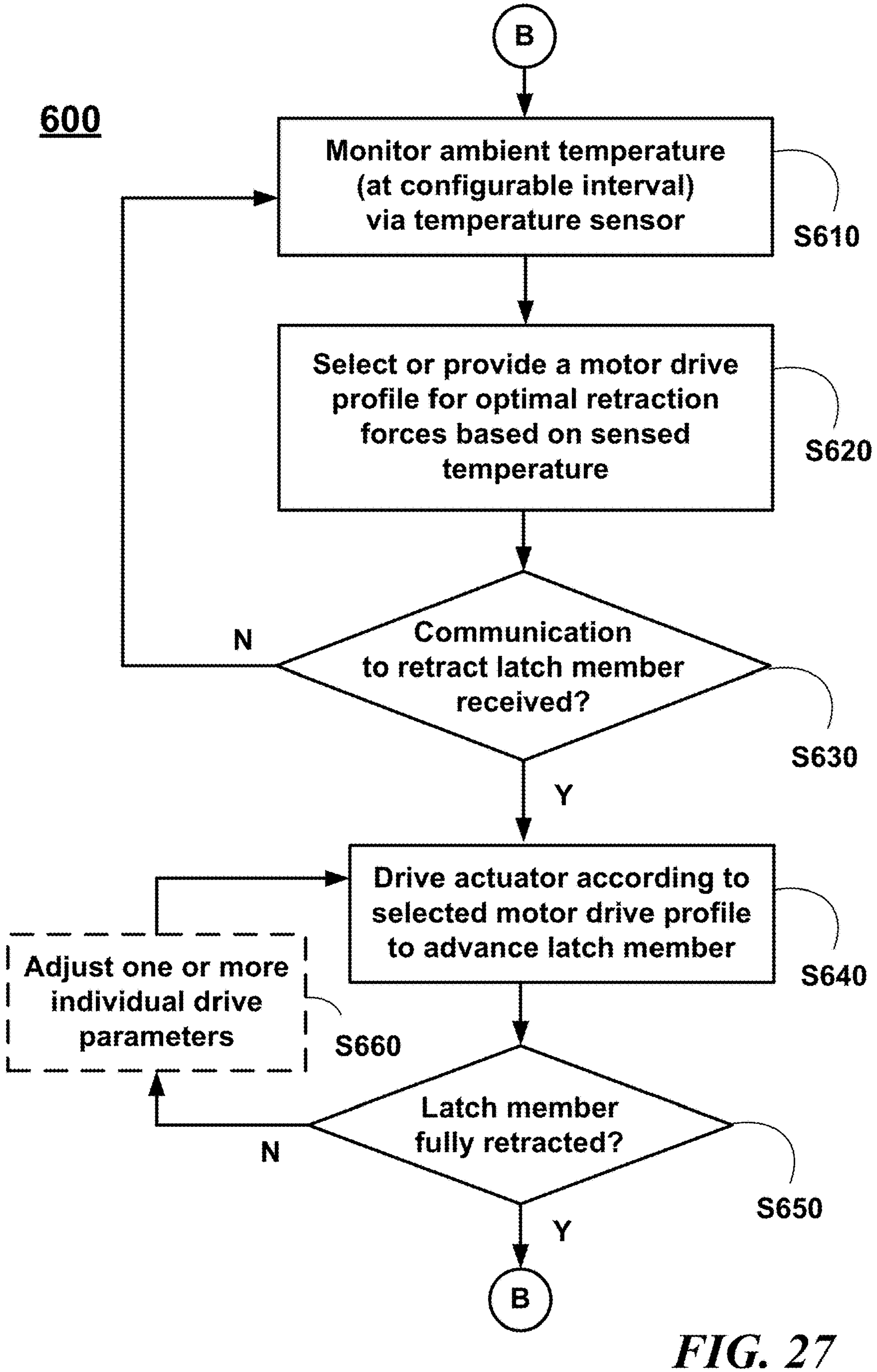
FIG. 27 is a flow chart of a method for selecting from different motor drive profiles and/or dynamically adjusting individual drive parameters according to a sensed temperature in accordance with another aspect of the present invention.

In accordance with another aspect, FIGS. 26 and 27 illustrate a diagram and flow chart for an exemplary method 600 in which PCB 72, 472 is configured to either provide a motor drive profile, select a motor drive profile from a plurality of available motor drive profiles, or dynamically create a motor drive profile in real-time to drive actuator 32, 232, 432 (e.g., stepper motor) when the sensed temperature value falls below a predetermined temperature threshold. For example, PCB 72, 472 may include an onboard control microcontroller (MCU) that is configured to drive a stepper motor, and continually monitor ambient temperature of in the vicinity of or within cabinet lock 22, 222, 422 at a configurable interval using temperature sensor 94 at step S610. At step S620, PCB 72, 472 (via control MCU) is configured to drive the stepper motor using a selected motor drive profile to provide optimal retraction forces based on the sensed temperature.

As best seen in FIG. 26, the motor drive profile over a given time period may be manifested in the form of a pulsed current signal directed to actuator 32, 232, 432 that comprises of one or more of a current profile that reflects the amount of current that is provided to the actuator 32, 232, 432 (e.g., stepper motor coil(s)), a speed profile that reflects the linear or rotational speed (e.g., steps/second) of a shaft of the actuator, and/or a drive frequency profile that represents the pulse frequency (i.e., STCK frequency (kHz)) that is provided to the actuator being imposed at a selected stepping modes (e.g., 1/256th, 1/32nd, 1/8th, full step). It should be understood that the motor drive profile shown in FIG. 26 is merely exemplary, and the components that make up the motor drive profile may be dynamically adjusted depending on the sensed temperature and/or the detected position of latch member 30, 230, 430 during the process of moving latch member 30, 230, 430 between unlocked and locked orientations. It should also be understood that one or more motor drive parameters that are controlled in the motor drive profile may be adjusted to change the characteristics of the motor drive profile, to provide for the plurality of different motor drive profiles, or to dynamically adjust the motor drive profile during the movement of latch member 30, 230, 430 between unlocked and locked orientations. The motor drive parameters may include, but are not limited to, the following:

Acceleration rate (pulses per second squared, pps$^2$),
Deceleration rate (pps$^2$),
Maximum speed (pps),
Minimum speed (pps),
Acceleration motor torque current (% of full-scale current defined by hardware (% FS)),
Deceleration motor torque current (% FS),
Run speed motor torque current (% FS),
Motor holding torque current (% FS), and
Stepping modes (full-wave, half-wave, 1/4, 1/8, 1/16, 1/32, 1/64, 1/128, 1/256).

By selectively adjusting the above-referenced motor drive parameters, PCB 72, 472 (onboard motor control MCU) is able to construct different speed profiles (FIG. 28), having different shapes such as trapezoidal and triangular, for example. In some example embodiments, PCB 72, 472 may be programmed in advance with (or may store and update) a mapping of different temperature values or temperature range to different corresponding motor drive profiles. For example, there may be a normal weather operating range of temperatures, a cold weather operating range defined below a first threshold temperature value, and a hot weather operating range defined above a second threshold value. The cold weather operating range could also be further subdivided by one or more additional threshold temperature values or ranges (e.g., to define an extreme cold weather operating range), and so on as needed depending on the implementation. In some other example embodiments, PCB 72, 472 may also be configured to adjust individual motor drive parameters of a given motor drive profile at any time (e.g., before, during, or after an unlocking cycle) to allow for optimal retraction of latch member 30, 230, 430 despite any changes in temperature.

Then when PCB 72, 472 receives a communication to retract latch member 30, 230, 430 from a remote device at step S630, PCB 72, 472 can drive actuator 32, 232, 432 according to the selected motor drive profile having optimal retraction forces for advancing latch member 30, 230, 430 under conditions associated with the sensed ambient temperature at step S640. PCB 72, 472 may further detect whether latch member 30, 230, 430 is fully retracted at step S650 using position sensor 482, and will then either return to step S640 and continue driving actuator 32, 232, 432 according to the selected motor drive profile, otherwise method 600 can either return to step S610 so that temperature monitoring can continue for subsequent cycles of operating the locking mechanism, or end once PCB 72, 472 detects that latch member 30, 230, 430 has reached the unlocked orientation. Optionally, when returning to step S640 after a "No" determination at step S650, PCB 72, 472 (via MCU) may also dynamically adjust one or more of the motor drive parameters of the selected motor drive profile at step S660 during a given unlocking cycle. Additionally or alternatively, PCB 72, 472 could also select a different motor drive profile at step S660 for the next period of the unlocking cycle in a similar manner.

Figure 28:
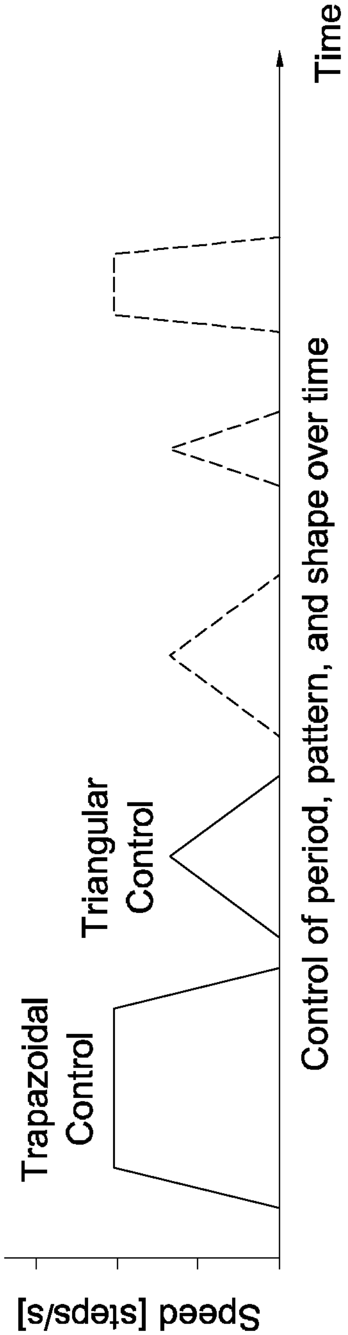
FIG. 28 is a diagram illustrating various examples of how a motor drive pattern including multiple drive profiles for powering the actuator can be controlled over time for different temperatures.
Figure 29:
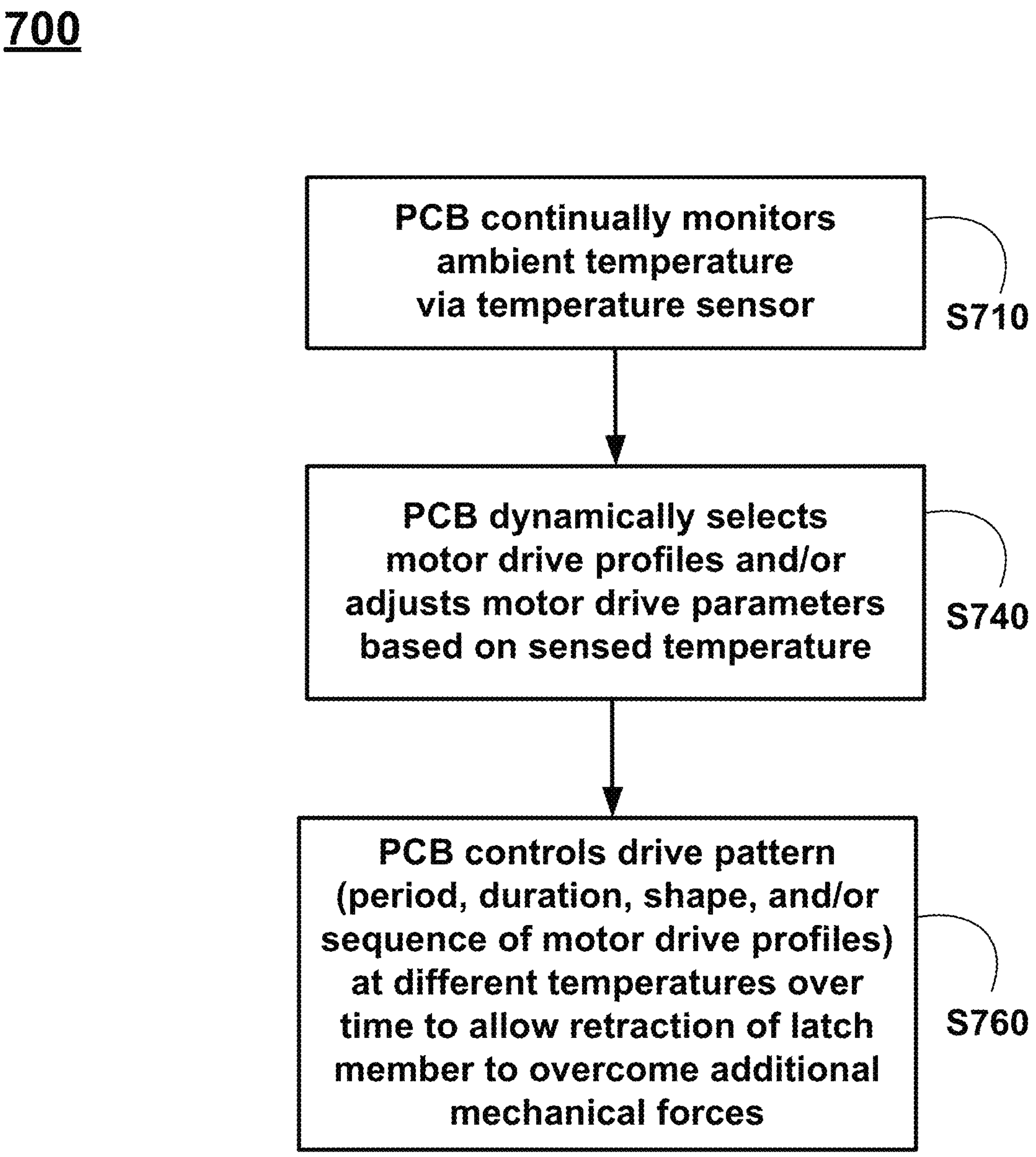
FIG. 29 is a flow chart of a method for controlling motor drive patterns including multiple different motor drive profiles over time based on a sensed temperature in accordance with yet another aspect of the present invention.

In accordance with a further aspect, FIGS. 28 and 29 illustrate an exemplary diagram and flow chart for a method 700 in which PCB 72, 472 (onboard motor control MCU) can also adjustably control motor drive patterns over time based on sensed temperature. It should be understood that a motor drive "pattern" may consist of a plurality of motor drive "profiles" (e.g., pattern_1=profile_1+profile_2+profile_3+profile_N) that may each have different drive "parameters" (e.g., profile_1=parameter_1+parameter_2+parameter_3+parameter_N), respectively. For example, in FIG. 28, varying speed profiles are illustrated as a function of time as an actuator is moving the latch member between locked and unlocked orientations. Similar to method 600 described above with reference to FIGS. 26 and 27, in method 700 the PCB 72. 472 continually senses the ambient temperature at a configurable interval of time via temperature sensor 94 at step S710, and provides or selects a motor drive profile and/or dynamically adjusts one or more drive parameters of a provided or selected motor drive profile for driving actuator 32, 232, 432 based on the sensed temperature at step S740. In addition, PCB 72, 472 (via onboard MCU) also has the ability to control motor drive patterns, such as by varying the period, duration, shape, and/or sequence of individual motor drive profiles (e.g., the trapezoidal or triangular speed profiles) at different temperatures over time, which allows for latch member 30, 230, 430 to overcome any additional mechanical forces exerted on the locking mechanism that result from changes in temperature and related external conditions at step S760. Thus, PCB 72, 472 can utilize sensors and programming of an onboard motor control MCU to ensure proper operation when unlocking latch member 30, 230, 430 by providing the ability to adapt motor drive parameters, motor drive profiles, and/or motor drive patterns to seasonal, weather-based, or other extreme temperature variations.

While the above-referenced discussion relates to providing a motor drive profile and/or dynamically adjusting one or more motor drive parameters to drive actuator 32, 232, 432 when the sensed temperature value falls below a predetermined temperature threshold, it should be understood that the above-referenced methods can also be adapted for situations where the sensed temperature value falls above a predetermined temperature threshold. If should also be understood that the above-referenced methods may be implemented using hardware, software stored in a memory of PCB that is executable by a processor, or a combination thereof.

In a further aspect of the present invention, cabinet lock 422 may be configured to mount within a traffic signal control box 10, as described above. As such, cabinet lock 422 may be exposed to atmospheric conditions, such as weather events (extreme heat, cold, rain or snow), as well as ambient temperature and humidity (and daily/seasonal changes thereof). To prevent, or minimize ingress of moisture (i.e. rain or snow) into latch housing 428 may include a gasket 496 between latch housing body 428' and latch housing cover plate 428". Moreover, should moisture enter latch housing 428 or condensation be produced within latch housing 428, bottom wall **428*b* of latch housing 428 may include one or more weep holes 498 designed to enable drainage of any such moisture from within latch housing 428**.

In accordance with another aspect of the invention, a method is provided for retrofitting electromechanical component 26, 226, 426 to an existing cabinet lock having only a latching component 24', the method including the steps of:

1. providing a cabinet lock having a latching component 24' wherein the latching component 24' includes a latch member 30, 230, 430;
2. providing an electromechanical component 26, 226, 426 including a respective actuator 32, 232, 432 connectable to a power source; wherein the electromechanical component 26, 226, 426 further includes a respective drive member 60, 260, 460; and
3. coupling said respective drive member 60, 260, 460, to said latch member 30, 230, 430 with connecting feature 61, 261, 461.

The electromechanical component 26, 226, 426 may further include a position sensor 482 for sensing the position of latch member 30, 230, 430 wherein the method further includes triggering of a signal by the position sensor that latch member is being translated from a locked orientation to an unlocked orientation, and/or a signal that said latch member has reached said unlocked orientation.

The electromechanical component 26, 226, 426 may further include a temperature sensor 94 for sensing the ambient temperature associated with the latching component 24' wherein the method further includes triggering of a signal by the temperature sensor that the temperature is below (or above) a predetermined threshold temperature value.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. A cabinet lock for securing a door panel to a cabinet housing, the cabinet lock comprising:

a) a latching component having a latch housing and a latch member reciprocally translatable between a locked orientation to secure said door panel to said cabinet housing and an unlocked orientation to free said door panel from said cabinet housing;

b) a temperature sensor configured for sensing an ambient temperature associated with said cabinet lock;

c) a position sensor; and d) an electromechanical component including a printed circuit board (PCB) and an actuator, wherein said actuator is operably coupled to a drive member, wherein said drive member is coupled to said latch member, wherein said PCB is in communication with said temperature sensor, said position sensor and said actuator, wherein when said PCB receives a control signal to move said latch member between said locked orientation and said unlocked orientation and said temperature sensor senses that said ambient temperature is below a predetermined threshold temperature, said PCB is configured to direct a pulsed current signal to said actuator to move said latch member between said locked orientation and said unlocked orientation, wherein said pulsed current signal is associated with a first motor drive profile, wherein said first motor drive profile is one of a plurality of motor drive profiles, wherein each of said plurality of motor drive profiles comprise a plurality of motor drive parameters, wherein said PCB is further configured to detect whether said latch member has reached said unlocked orientation utilizing said position sensor, and wherein said PCB selects a second motor drive profile to move said latch member to said unlocked orientation based on a determination by said position sensor that said latch member has not reached said unlocked orientation, wherein said second motor drive profile is one of said plurality of motor drive profiles, and wherein said plurality of motor drive parameters of said second motor drive profile are dynamically adjusted based on said ambient temperature sensed by said temperature sensor.

2. The cabinet lock in accordance with claim 1 wherein said actuator is a stepper motor.

3. The cabinet lock in accordance with claim 1, wherein said PCB is configured to direct said pulsed current signal to said actuator to move said latch member between said locked orientation and said unlocked orientation according to a third motor drive profile when said ambient temperature is at or above said predetermined threshold temperature, and wherein said first motor drive profile is different than said third motor drive profile.

4. The cabinet lock in accordance with claim 1, wherein said PCB is configured for selecting said first motor drive profile from said plurality of motor drive profiles based on said sensed ambient temperature.

5. The cabinet lock in accordance with claim 4, wherein the plurality of motor drive parameters includes acceleration rate, deceleration rate, maximum speed, minimum speed, acceleration motor torque current, deceleration motor torque current, run speed motor torque current, motor holding torque current, and stepping modes.

6. The cabinet lock in accordance with claim 5, wherein said PCB is further configured to adjust any of said motor drive parameters when said pulse current signal is provided to said actuator to optimize retraction of said latch member.

7. The cabinet lock in accordance with claim 4, wherein said first motor drive profile includes a speed profile, wherein said PCB is further configured to vary at least one of a period, a duration, a shape, and/or a sequence of said speed profile when said actuator is moving said latch member between said locked orientation and said unlocked orientation.

8. A traffic signal control box comprising:

a) a cabinet having a cabinet housing defining an interior therein;

b) a door panel mounted to said cabinet housing and configured to cover said interior when in a closed condition; and c) the cabinet lock as set forth in claim 1.

9. An electromechanical component for a locking mechanism, wherein the locking mechanism includes a latching component having a latch member reciprocally movable between a locked orientation and an unlocked orientation, said electromechanical component comprising:

a) a drive member configured to be coupled to said latch member;

b) an actuator operably coupled to said drive member;

c) a temperature sensor for sensing an ambient temperature associated with said locking mechanism;

d) a position sensor; and e) a printed circuit board (PCB) in communication with said temperature sensor, said position sensor and said actuator, wherein when said PCB receives a control signal to move said latch member between said locked orientation and said unlocked orientation and said temperature sensor senses that said ambient temperature is below a predetermined threshold temperature, said PCB is configured to direct a pulsed current signal to said actuator to move said latch member between said locked orientation and said unlocked orientation, wherein said pulsed current signal is associated with a first motor drive profile, wherein said first motor drive profile is one of a plurality of motor drive profiles, wherein each of said plurality of motor drive profiles comprise a plurality of motor drive parameters, wherein said PCB is further configured to detect whether said latch member has reached said unlocked orientation utilizing said position sensor, wherein said PCB selects a second motor drive profile to move said latch member to said unlocked orientation based on a determination by said position sensor that said latch member has not reached said unlocked orientation, wherein said second motor drive profile is one of said plurality of motor drive profiles, and wherein said plurality of motor drive parameters of said second motor drive profile are dynamically adjusted based on said ambient temperature sensed by said temperature sensor.

10. The electromechanical component in accordance with claim 9 wherein said actuator is a stepper motor.

11. The electromechanical component in accordance with claim 9, wherein said PCB is configured to direct said pulsed current signal to said actuator to move said latch member between said locked orientation and said unlocked orientation according to a third motor drive profile when said ambient temperature is at or above said predetermined threshold temperature, and wherein said first motor drive profile is different than said third motor drive profile.

12. The electromechanical component in accordance with claim 9, wherein said PCB is configured for selecting said first motor drive profile from said plurality of motor drive profiles based on said sensed ambient temperature.

13. The electromechanical component in accordance with claim 12, wherein the plurality of motor drive parameters includes acceleration rate, deceleration rate, maximum speed, minimum speed, acceleration motor torque current, deceleration motor torque current, run speed motor torque current, motor holding torque current, and stepping modes.

14. The electromechanical component in accordance with claim 13, wherein said PCB is further configured to adjust any of said motor drive parameters when said pulse current signal is provided to said actuator to optimize retraction of said latch member.

15. The electromechanical component in accordance with claim 12, wherein said first motor drive profile includes a speed profile, wherein said PCB is further configured to vary at least one of a period, a duration, a shape, and/or a sequence of said speed profile when said actuator is moving said latch member between said locked orientation and said unlocked orientation.

16. A method of actuating a latch member between a locked orientation to secure a door panel to a cabinet housing and an unlocked orientation to free the door panel from the cabinet housing, wherein an electromechanical component includes a printed circuit board (PCB) and an actuator, wherein the actuator is operably coupled to a drive member, and wherein the drive member is coupled to the latch member, the method comprising:

receiving a control signal to move the latch member between the locked orientation and the unlocked orientation;

sensing an ambient temperature associated with the latch member;

determining if the sensed ambient temperature is below a predetermined threshold temperature;

if it is determined that the sensed ambient temperature is below the predetermined threshold temperature, directing a pulsed current signal to the actuator to move the latch member between the locked orientation and the unlocked orientation, wherein the pulsed current signal is associated with a first motor drive profile, wherein the first motor drive profile is one of a plurality of motor drive profiles, wherein each of the plurality of motor drive profiles comprise a plurality of motor drive parameters; and utilizing a position sensor, determining whether the latch member has not reached the unlocked orientation, wherein, after directing the pulsed current signal with the first motor drive profile, a second motor drive profile is selected to provide the pulsed current signal based on the position sensor determining that the latch has not reached the unlocked position, wherein the second motor drive profile is one of the plurality of motor drive profiles, and dynamically adjusting said plurality of motor drive parameters of said second motor drive profile based on said ambient temperature sensed by said temperature sensor.

17. The method in accordance with claim 16 wherein said actuator is a stepper motor.

18. The method in accordance with claim 16, further comprising:

directing the pulsed current signal to the actuator to move the latch member between the locked orientation and the unlocked orientation according to a third motor drive profile when the sensed ambient temperature is at or above the predetermined threshold temperature, wherein the first motor drive profile is different than the third motor drive profile.

19. The method in accordance with claim 16, wherein the method further comprises:

selecting the first motor drive profile from the plurality of motor drive profiles based on the sensed ambient temperature.

20. The method in accordance with claim 19, wherein the plurality of motor drive parameters includes acceleration rate, deceleration rate, maximum speed, minimum speed, acceleration motor torque current, deceleration motor torque current, run speed motor torque current, motor holding torque current, and stepping modes.

21. The method in accordance with claim 20, further comprising:

selectively adjusting the one or more of the plurality of motor drive parameters when the pulse current signal is provided to the actuator to optimize retraction of the latch member.

22. The method in accordance with claim 19, wherein the first motor drive profile includes a speed profile, and wherein the method further comprises:

varying at least one of a period, a duration, a shape, and/or a sequence of the speed profile when the actuator is moving the latch member between the locked orientation and the unlocked orientation.

* * * * *